United States Patent
Hwang et al.

(10) Patent No.: US 7,698,515 B2
(45) Date of Patent: Apr. 13, 2010

(54) INFORMATION STORAGE MEDIUM, RECORDING/REPRODUCING APPARATUS, AND RECORDING/REPRODUCING METHOD

(75) Inventors: Sung-hee Hwang, Suwon-si (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 11/258,133

(22) Filed: Oct. 26, 2005

(65) Prior Publication Data

US 2006/0123283 A1 Jun. 8, 2006

(30) Foreign Application Priority Data

Nov. 12, 2004 (KR) ............... 10-2004-0092641

(51) Int. Cl.
G06F 12/00 (2006.01)
G06F 13/00 (2006.01)
G06F 13/28 (2006.01)
G11C 29/00 (2006.01)

(52) U.S. Cl. .............. 711/159; 711/154; 711/155; 714/710

(58) Field of Classification Search ............ 711/159; 714/710

See application file for complete search history.

(56) References Cited

U.S. PATENT DOCUMENTS 5,745,444 A * 4/1998 Ichikawa et al. ......... 369/13.28

(Continued)

FOREIGN PATENT DOCUMENTS

| EP | 1 041 560 | 10/2000 |
|---|---|---|
| EP | 1 329 888 | 7/2003 |
| JP | 11-306648 | 11/1999 |
| JP | 2000-100078 | 4/2000 |
| JP | 2002-163864 | 6/2002 |

OTHER PUBLICATIONS

Search Report and Written Opinion from International Patent Application No. PCT/KR2005/003776 issue on Feb. 10, 2006.

(Continued)

*Primary Examiner*—Pierre-Michel Bataille
*Assistant Examiner*—Ralph A Verderamo, III
(74) *Attorney, Agent, or Firm*—Stein McEwen, LLP

(57) ABSTRACT

An information storage medium, a recording/reproducing apparatus and a recording/reproducing method are provided to increase data reproduction efficiency. The recording/reproducing apparatus includes: a write/read unit for recording data on an information storage medium and reading data from the medium; and a controller for controlling the write/read unit to record a replacement block by logical overwrite (LOW) for updating data recorded on the medium in a first area of the medium, record a replacement block for replacing a defect block generated on the medium in a second area of the medium, and record a second replacement block for replacement by defect of a first replacement block in the second area if the defect is detected while the first replacement block is being recorded in the first area to perform the logical overwrite of an original block recorded in a predetermined area of the medium, generate a defect list (DFL) entry including location information of the original block and location information of the second replacement block in order to indicate the replacement state, and move location information of the first replacement block in the second replacement block. As a result, an area for replacement by defect and an area for replacement by LOW are discriminated from each other, and data reproducing efficiency can be improved by effectively managing replacement information though the replacement by defect due to a defect generated during the replacement by LOW.

10 Claims, 14 Drawing Sheets

U.S. PATENT DOCUMENTS

| | | | |
|---|---|---|---|
| 6,138,203 A * | 10/2000 | Inokuchi et al. | 711/103 |
| 6,341,109 B1 | 1/2002 | Kayanuma | |
| 2002/0136537 A1 | 9/2002 | Takahashi | |
| 2004/0078635 A1 | 4/2004 | Ko | |
| 2006/0034411 A1 * | 2/2006 | Park | 375/376 |

OTHER PUBLICATIONS

U.S. Appl. No. 12/102,982, filed Apr. 15, 2008, Sung-hee Hwang et al., Samsung Electronics Co., Ltd.

Search Report issued by European Patent Office in European Patent Application No. 05820466.0-2210.

* cited by examiner

INFORMATION STORAGE MEDIUM, RECORDING/REPRODUCING APPARATUS, AND RECORDING/REPRODUCING METHOD

CROSS-REFERENCE TO RELATED APPLICATIONS

This application claims all benefits accruing under 35 U.S.C. §119 from Korean Patent Application No. 2004-92641, filed on Nov. 12, 2004, in the Korean Intellectual Property Office, the disclosure of which is incorporated by reference herein.

BACKGROUND OF THE INVENTION

1. Field of the Invention

The present invention relates to an information storage medium, and more particularly, to an information storage medium, such as an optical disk, a recording/reproducing apparatus therefore, and a recording/reproducing method for providing efficient defect management of an information storage medium, including data replacement by logical overwrite (LOW) and data replacement by defect.

2. Related Art

For rewritable information storage media, a spare area is typically provided in a data area for defect management. That is, if a defect is detected while user data is being recorded in a user data area (an area in the data area that excludes the spare area), or while user data recorded in the user data area is being reproduced, replacement data for replacing defect data is recorded in the spare area.

For write-once information storage media, the above defect management technique is used in a logical overwrite (LOW). LOW is known as a method in which write-once information storage media can be used in the same manner as the rewritable information storage media. That is, to update data previously recorded in the user data area, recorded data can be considered as defect data, and data to replace the recorded data can be recorded in the spare area by treating the recorded data as defect data. This makes data management easier since a host can access data using a logical address thereof and data for replacing the recorded data in the user data area can be overwritten at the same location by using the fixed logical address of the data recorded in the user data area and assigning a physical address corresponding to the fixed logical address to the data recorded in the spare area.

Furthermore, a new method which implements LOW for defect management has been suggested to maximize the use of an information storage medium. In such a method, updated data can also be recorded in a non-recorded portion of a user data area, or a spare area on an information storage medium, and replacement information (replacement entry information) can be prepared accordingly.

Data updating by replacement by LOW and replacement by defect will now be described with reference to FIGS. 1A to 1D as follows.

FIG. 1A is an illustrative diagram of an example data area on an information storage medium used to illustrate data replacement when a logical overwrite (LOW) is implemented for defect management.

Referring to FIG. 1A, a data area 100 includes a user data area 110 and at least one spare area 120. Data is typically recorded from a start address of the user data area 110. As shown in FIG. 1A, when data blocks A1, A2, and A3 which have been already recorded at physical locations P1, P2, and P3 in the user data area 110 on an information storage medium, respectively, are to be updated, a host commands a drive system to record data blocks B1, B2, and B3 at the original locations P1, P2, and P3 so as to update the data blocks A1, A2, and A3 to the data blocks B1, B2, and B3 by LOW. The drive system records the data blocks B1, B2, and B3 at physical locations P4, P5, and P6 in the user data area 110 on the information storage medium, and generates a defect list (DFL) entry 130 indicating that the original locations P1, P2, and P3 have been replaced with the replacement locations P4, P5, and P6, as shown in FIG. 1B.

Thereafter, if the host commands the drive system to reproduce the data blocks B1, B2, and B3 from logical addresses corresponding to the original locations, the drive system reproduces the data blocks B1, B2, and B3 recorded at the replacement locations P4, P5, and P6 by referring to the DFL entry 130, and transmits the reproduced data blocks B1, B2, and B3 to the host. When the drive system cannot reproduce the data blocks B1, B2, and B3 recorded at the replacement locations P4, P5, and P6, data recorded at the replacement locations cannot be guaranteed to be the same as the data recorded at the original locations since the replacement locations P4, P5, and P6 are located in the user data area 110. As a result, the drive system continuously retries to reproduce the data blocks B1, B2, and B3 recorded at the replacement locations P4, P5, and P6, and if the drive system fails to reproduce the data blocks B1, B2, and B3, the drive system informs the host that the data blocks B1, B2, and B3 cannot be reproduced.

FIG. 1C is an illustrative diagram of an example data area on an information storage medium used to illustrate conventional replacement by defect.

Referring to FIG. 1C, a data area 100 also includes a user data area 110 and at least one spare area 120. Data is also recorded from a start address of the user data area 110. As shown in FIG. 1C, when a host commands a drive system to record data blocks A1, A2, and A3 at logical addresses corresponding to original locations P1, P2, and P3 in the user data area 110 on an information storage medium, respectively, the drive system detects a defect at the physical location P2 while recording the data blocks A1, A2, and A3 at the physical locations P1, P2, and P3, records the data block A2 at a replacement location Ps in the spare area 120 on the information storage medium by replacing the original location P2 with the replacement location Ps, and generates a defect list (DFL) entry 130 indicating that the original location P2 was replaced with the replacement location Ps, as shown in FIG. 1D.

Thereafter, if the host commands the drive system to reproduce the data block A2 at the logical address corresponding to the original location P2, the drive system reproduces the data block A2 recorded at the replacement location Ps by referring to the DFL entry 130, and transmits the reproduced data block A2 to the host. If the drive system cannot reproduce the data block A2 recorded at the replacement location Ps due to a defect, the drive system can consider the data block A2 recorded at the original location P2 as being the same as the data block A2 recorded at the replacement location Ps since Ps is the replacement location in the spare area 120, as shown in FIG. 1C. As a result, even if the drive system cannot reproduce the data block A2 recorded at the replacement location Ps, the drive system can try to reproduce the data block A2 recorded at the original location P2. If the data block A2 recorded at the original location P2 is error-correctable, the drive system can transmit the error-corrected data block A2 to the host.

In order to maximize utilization of disk capacity and manage information recording media by discriminating between replacement by LOW and replacement by defect, techniques to discriminate between an area for replacement by LOW and an area for replacement by defect have been developed. In one of these techniques, an area for replacement by defect is limited to a spare area allocated for conventional replacement by defect, as shown, for example, in FIG. 1C, and an area for replacement by LOW is limited to a user data area of a data area or a specific area of the user data area, except the spare area, as shown, for example, in FIG. 1A. Thus, whether data at a replacement location has been recorded by replacement by LOW or by replacement by defect can be determined by confirming an area in which the replacement location of a DFL entry (also known as a replacement entry, a defect entry, or a defect/replacement entry) exists.

For write-once information storage media, user data of a replacement block after replacement by defect is the same as user data of an original block before the replacement by defect. However, since the replacement by LOW is mainly used to update data, there is no guarantee that user data of a replacement block be the same as user data of an original block before the replacement by LOW. If a replacement block indicated by a DFL entry is located in a spare area, there is a perception that the DFL entry has been generated due to a defect. Accordingly, user data of an original block can be regarded as being the same as user data of the replacement block. Thus, if the replacement block cannot be error-corrected due to a defect when it is reproduced, the user data can be obtained by reproducing the original block indicated by the DFL entry. More specifically, even if the original block cannot be error-corrected since the original block has been replaced due to the defect, the original block may be sometimes error-corrected by cleaning the dust from a recording surface of an information storage medium.

In this situation, the replacement by defect and the replacement by LOW are discriminated from each other to determine whether user data of a replacement block is the same as user data of an original block by recognizing areas in which replacement blocks of the DFL entry for the two type of replacements are recorded.

However, if a defect occurs during the replacement by LOW, a replacement block by LOW in which the defect occurs should be replaced again. That is, an original block can initially be replaced with a replacement block via replacement by LOW, and then can finally be replaced with a replacement block in a spare area via replacement by defect. As a result of this process, user data of the original block is not the same as user data of the final replacement block due to the intermediate replacement by LOW. Thus, even if a replacement block exists in a spare area, there is no guarantee that user data of the replacement block be the same as user data of the original block.

Accordingly, there is a need to ensure that user data of a replacement block is the same as user data of an original block so as to maximize data usage and increase data reproduction efficiency.

SUMMARY OF THE INVENTION

Various aspects and embodiments of the present invention advantageously provide an information storage medium for use in conjunction with a recording/reproducing apparatus and methods to increase data reproduction efficiency in which a replacement area for replacement by LOW is discriminated from a replacement area for replacement by defect.

According to an aspect of the present invention, there is provided an information storage medium comprising: a first area for updating data recorded on the medium via replacement by logical overwrite (LOW); and a second area for replacing defects occurred on the medium, wherein, if a defect is detected while a first replacement block is being recorded in the first area to replace an original block recorded in a predetermined area of the medium according to the replacement by LOW, a second replacement block for replacing the first replacement block is recorded in the second area via replacement by defect, and wherein a defect list (DFL) entry indicating the replacement state includes location information of the original block and location information of the second replacement block, and the second replacement block includes location information of the first replacement block.

The second replacement block may be a recording/reproducing unit block including a user data portion for user data and an additional information portion for the location information of the first replacement block.

The additional information portion may be recorded to have better error correction capability than that of the user data portion.

The location information of the original block and the location information of the second replacement block may be represented by addresses of a physical space of the medium. The first area is a user data area, and the second area is a spare area on the information storage medium.

According to another aspect of the present invention, there is provided an information storage medium comprising: a first area for updating data recorded on the medium via replacement by logical overwrite (LOW); and a second area for replacing defects occurred on the medium, wherein, if a defect is detected while a first replacement block is being recorded in the first area to replace an original block recorded in a predetermined area of the medium according to the replacement by LOW, a second replacement block for replacing the first replacement block is recorded in the second area via replacement by defect, and wherein a first defect list (DFL) entry indicating the state of the replacement by LOW and a second DFL entry indicating the replacement state of the replacement by the defect occurred during the replacement by LOW are provided.

The first DFL entry may further include link state information for indicating that the first replacement block related to the first DFL entry has been replaced with the second replacement block. The first area may be a user data area, and the second area may be a spare area on the information storage medium.

According to another aspect of the present invention, there is provided an information storage medium on which logical overwrite (LOW) replacement for updating data recorded on the medium is performed in a user data area, a defect list (DFL) entry including location information of an original block and location information in a replacement block is generated to indicate the replacement state, and the location information of the replacement block in the DFL entry is permitted to be location information of an original block of another DFL entry if a space according to a data write command is a logically un-recorded space, but is a physically recorded space.

According to yet another aspect of the present invention, there is provided a recording/reproducing apparatus comprising: a write/read unit arranged to record data on an information storage medium and to read data from the medium; and a controller for controlling the write/read unit to record a replacement block by logical overwrite (LOW) for updating data recorded on the medium in a first area of the medium, record a replacement block for replacing a defect block occurred on the medium in a second area of the medium, and record a second replacement block for replacement by defect of a first replacement block in the second area if the defect occurs while the first replacement block is being recorded in the first area to perform the logical overwrite of an original block recorded in a predetermined area of the medium, for generating a defect list (DFL) entry including location information of the original block and location information of the second replacement block so as to indicate the replacement state, and arranging location information of the first replacement block in the second replacement block.

According to another aspect of the present invention, there is provided a recording/reproducing apparatus comprising: a write/read unit arranged to record data on an information storage medium and to read data from the medium; and a controller for controlling the write/read unit to record a replacement block by logical overwrite (LOW) for updating data recorded on the medium in a first area of the medium, record a replacement block for replacing a defect block occurred on the medium in a second area of the medium, and record a second replacement block for replacement by defect of a first replacement block in the second area if the defect occurs while the first replacement block is being recorded in the first area to perform the logical overwrite of an original block recorded in a predetermined area of the medium, and for generating a first defect list (DFL) entry indicating the state of the replacement by LOW and a second DFL entry indicating the state of the replacement by defect occurred during the replacement by LOW.

According to yet another aspect of the present invention, there is provided a recording/reproducing apparatus comprising: a write/read unit arranged to record data on an information storage medium and to read data from the medium; and a controller for controlling the write/read unit to record replacement data by logical overwrite (LOW) for updating data recorded on the medium in a user data area, for generating a defect list (DFL) entry including location information of an original block and location information of a replacement block so as to indicate the replacement state, and for setting the location information of the replacement block in the DFL entry to location information of an original block in another DFL entry if a space according to a data write command is a logically un-recorded space, but is a physically recorded space.

According to another aspect of the present invention, there is provided a recording/reproducing method comprising: recording a replacement block by logical overwrite (LOW) for updating a block recorded on an information storage medium in a first area of the medium and recording a replacement block for replacing a defect block occurred on the medium in a second area of the medium; recording a second replacement block for replacement by defect of a first replacement block in the second area by moving location information of the first replacement block in the second replacement block if the defect occurs while the first replacement block is being recorded in the first area to perform the logical overwrite of an original block recorded in a predetermined area of the medium; and generating a defect list (DFL) entry including location information of the original block and location information of the second replacement block so as to indicate the replacement state.

According to another aspect of the present invention, there is provided a recording/reproducing method comprising: recording a replacement block by logical overwrite (LOW) for updating a block recorded on an information storage medium in a first area of the medium, recording a replacement block for replacing a defect block occurred on the medium in a second area of the medium, and recording a second replacement block for replacement by defect of a first replacement block in the second area if the defect occurs while the first replacement block is being recorded in the first area to perform the logical overwrite of an original block recorded in a predetermined area of the medium; and generating a first defect list (DFL) entry indicating the state of the replacement by LOW and a second DFL entry indicating the replacement state of the replacement by defect occurred during the replacement by LOW.

According to another aspect of the present invention, there is provided a recording/reproducing method comprising: recording replacement data by logical overwrite (LOW) for updating a block recorded on an information storage medium in a user data area; generating a defect list (DFL) entry including location information of an original block and location information of a replacement block in order to indicate the replacement state; and setting the location information of the replacement block of the DFL entry to location information of an original block in another DFL entry if a space according to a data write command is a logically un-recorded space, but is a physically recorded space.

According to yet another aspect of the present invention, there is provided a reproducing apparatus comprising: a read unit for reading data from an information storage medium; and a controller for controlling the read unit to read a replacement block recorded at a replacement location based on replacement location information included in a defect list (DFL) entry related to data to be reproduced, and if error correction of the read replacement block fails, controlling the read unit to obtain a location of a previous replacement block from an additional information portion included in the replacement block and read a replacement block recorded at the location of the previous replacement block, and reproducing the read replacement block.

According to another aspect of the present invention, there is provided a reproducing apparatus comprising: a read unit for reading data from an information storage medium; and a controller for controlling the read unit to read a replacement block recorded at a replacement location based on replacement location information included in a second defect list (DFL) entry linked to a first DFL entry related to data to be reproduced if link state information is set in the first DFL entry, and if reproduction of the read replacement block fails, controlling the read unit to read a replacement block recorded at a replacement location based on replacement location information included in the first DFL entry, and reproducing the read replacement block.

According to yet another aspect of the present invention, there is provided a data reproducing method comprising: reading a replacement block recorded at a replacement location based on replacement location information included in a defect list (DFL) entry related to data to be reproduced; if error correction of the read replacement block fails, obtaining a location of a previous replacement block from an additional information portion included in the replacement block; and reading a replacement block recorded at the location of the previous replacement block and reproducing the read replacement block.

According to another aspect of the present invention, there is provided a data reproducing method comprising: reading a replacement block recorded at a replacement location based on replacement location information included in a second defect list (DFL) entry linked to a first DFL entry related to data to be reproduced if link state information is set in the first DFL entry; and if reproduction of the read replacement block fails, reading a replacement block recorded at a replacement location based on replacement location information included in the first DFL entry and reproducing the read replacement block.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1A:
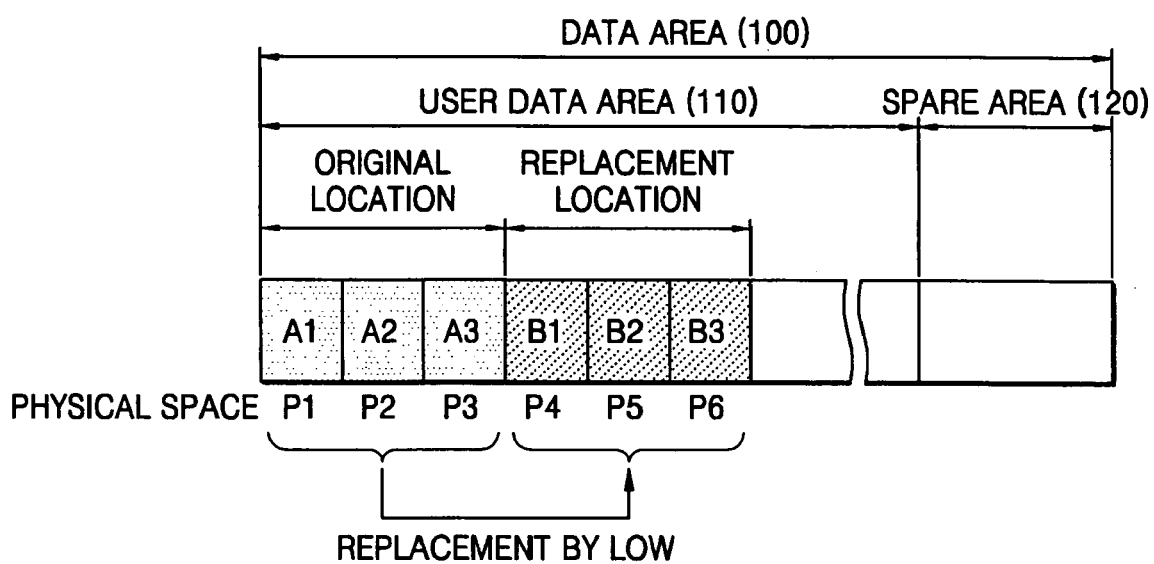
FIG. 1A is an illustrative diagram of an example data area on an information storage medium used to illustrate data replacement when a logical overwrite (LOW) is implemented for defect management.
Figure 1B:
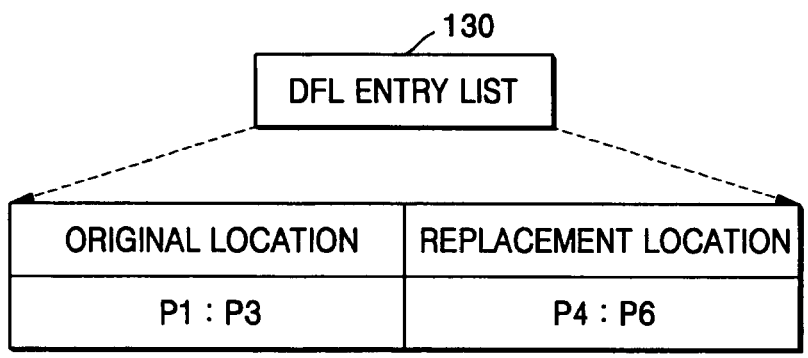
FIG. 1B is a diagram of a DFL entry list according to the data replacement by LOW as illustrated in FIG. 1A.
Figure 1C:
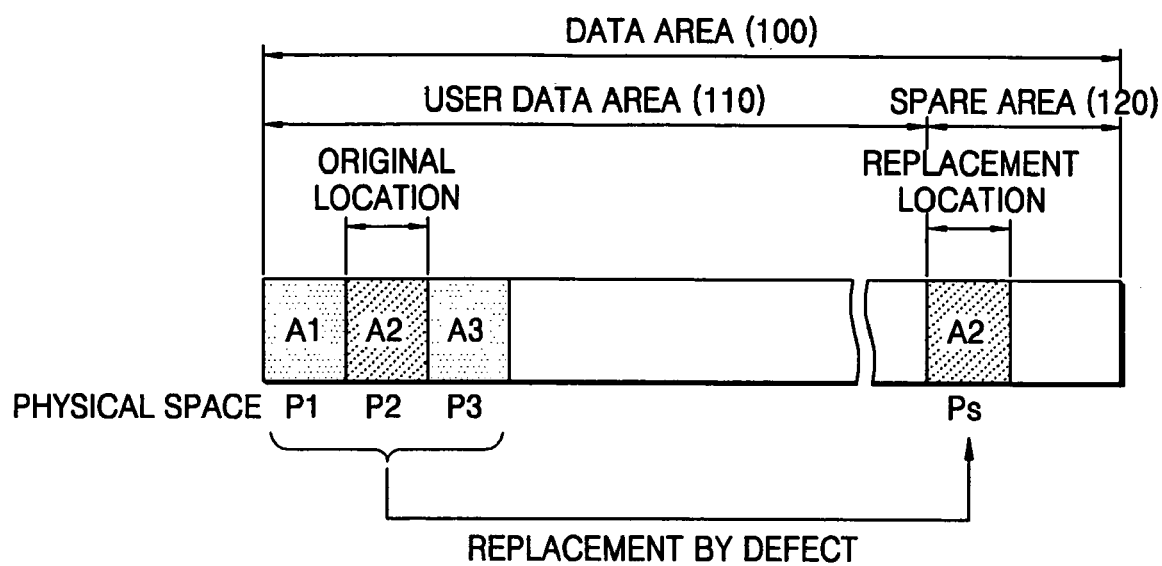
FIG. 1C is an illustrative diagram of an example data area on an information storage medium used to illustrate data replacement by defect.
Figure 1D:
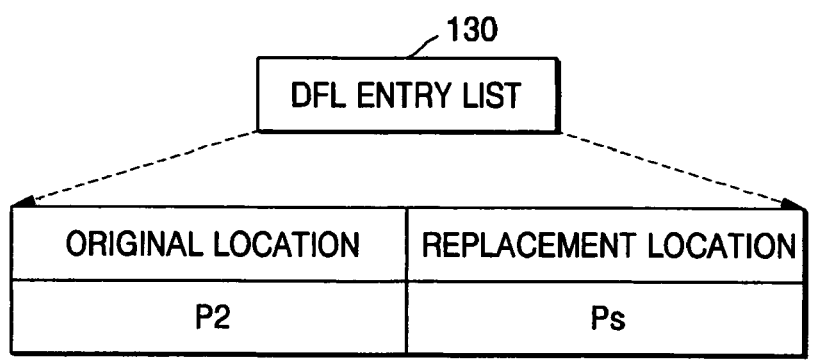
FIG. 1D is a diagram of a DFL entry list according to the data replacement by defect as illustrated in FIG. 1C.

The present invention is applicable for use with all types of memory or computer-readable media, recording and/or reproducing apparatuses, and computer systems implemented methods described according to various embodiments of the present invention. However, for the sake of simplicity, discussions will concentrate mainly on exemplary use of an optical disk serving as a write-once information storage medium, although the scope of the present invention is not limited thereto.

The present invention suggests two methods for data replacement when a defect occurs during replacement by logical overwrite (LOW).

According to the first method, when a defect occurs during replacement by LOW, data replacement is performed in a spare area provided in a data area on an information storage medium for replacement by defect, a defect list (DFL) entry is generated to indicate a replacement state, that is, an original block has been replaced with a final replacement block, and location information of a block just before the replacement is included in an additional information portion of the final replacement block. For example, if an intermediate replacement block B is determined as a defect block due to a recording error or using a method such as verify-after-write, while an original block A in a user data area on an information storage medium is being replaced with the intermediate replacement block B in the user data area via replacement by LOW, the original block A is replaced with a final replacement block C. A DFL entry is then generated to indicate that the original block A has been replaced with the final replacement block C, and location information of the intermediate replacement block B is stored in an additional information portion of the final replacement block C. Also, location information of the original block A is stored in an additional information portion of the intermediate replacement block B.

Thus, if the final replacement block C cannot be reproduced due to a defect, a drive system refers to the location information stored in the additional information portion included in the final replacement block C, and if the location information indicates a location in the user data area on an information storage medium, the drive system reproduces the intermediate replacement block B in the user data area by considering that the intermediate replacement block B corresponding to the location is replaced with the final replacement block C, and then user data of the intermediate replacement block B is the same as user data of the final replacement block C.

Even if user data in a recording/reproducing block cannot be error-corrected, additional information stored in the recording/reproducing block can be obtained. Moreover, it is preferable that error correction capability of an error correction block for the additional information be greater than error correction capability of an error correction block for the user data in a Blu-ray disk structure. An error correction code (ECC) format in the Blue-ray disk structure is comprised of a long distance code (LDC) cluster for the user data and a burst indicator subcode (BIS) cluster for the additional information. As a result, the user data and the additional information are comprised of different error correction blocks from each other. Since the BIS cluster is comprised of (62, 30, 32) Reed Solomon (RS) codes and the LDC cluster is comprised of (248, 216, 32) RS codes, error correction capability of the BIS cluster is excellent. Thus, even if the LDC cluster for the user data cannot be error-corrected, the BIS cluster can be error-corrected in most cases.

According to the second method, when a defect occurs during replacement by LOW, data replacement is performed in the spare area provided on an information storage medium for the replacement by defect. To indicate the replacement state, a DFL entry, which includes state information indicating that an original block is replaced with a replacement block (a defect block) via replacement by LOW, and the DFL entry is linked to another DFL entry, and a DFL entry, which indicates that the replacement block (the defect block) replaced by LOW is replaced with a final replacement block (this DFL entry may further include link state information indicating that this DFL entry is linked to the previous DFL entry), are generated.

In the second method, a state in which two or more DFL entries are linked to each other can be known using the following method. If a host commands a drive system to reproduce some sectors of a block or an entire block, the drive system determines whether a physical location according to the command is replaced in another area by examining DFL entries. If link state information of a corresponding DFL entry is not set, a replacement block corresponding to the DFL entry is reproduced. However, if the link state information is set, another DFL entry in which the replacement block corresponding to the DFL entry is set to an original block is sought, and a replacement block corresponding to the sought DFL entry is reproduced. That is, in the second method, the replacement by LOW and the replacement by defect are discriminated from each other. If a defect occurs during the replacement by LOW, a DFL entry generated via replacement by LOW and a DFL entry generated via replacement by defect are discriminated from each other, and link state information provided to link the DFL entries is stored in at least the DFL entry by LOW. That is, the DFL entry generated via replacement by LOW includes state information indicating that an original block A is replaced with an intermediate replacement block B, and the DFL entry is linked to another DFL entry. The DFL entry generated via replacement by defect indicates that the intermediate replacement block B is replaced with a final replacement block C.

Thus, during data reproduction, if the host commands the drive system to reproduce the original block A, the drive system seeks a DFL entry having an original address corresponding to the original block A and obtains a replacement address (the intermediate replacement block B) with which the original address (the original block A) is replaced, and if link state information of the DFL entry is set, the drive system seeks a DFL entry having an original address equal to the replacement address (the intermediate replacement block B), obtains a replacement address (the final replacement block C) with which the original address (the intermediate replacement block B) is replaced, reproduces the final replacement block C, and transmits the reproduced final replacement block C to the host. If the user data cannot be reproduced due to a defect while the final replacement block C in the spare area on an information storage medium is being reproduced, and since the final replacement block C is in the spare area, it can be known that the final replacement block C is a replacement block replaced by replacement by defect. Also, since it can also be known that user data of the final replacement block C is the same as user data recorded at the original address of the DFL entry (the intermediate replacement block B), the intermediate replacement block B can be reproduced instead.

In summary, for write-once information storage media, since user data of a replacement block by replacement by defect is the same as user data of a corresponding defect block, and if the replacement by LOW and the replacement by defect are area-discriminated from each other by determining an area in which the replacement block is recorded, it can be determined whether the replacement is performed by replacement by defect, i.e., whether contents of replaced user data are the same as contents of original user data. To maintain this advantage even if replacement is performed again due to a defect occurred during the replacement by LOW, the present invention suggests the first method in which if a defect occurs during the replacement by LOW, the defect is replaced by a replacement block in the spare area on an information storage medium via replacement by defect, a DFL entry indicate that an original block is replaced with a final replacement block, and location information of a previous replacement block is stored in the final replacement block. The present invention also suggests the second method in which if a defect is occurred during the replacement by LOW, the defect is replaced by a replacement block in the spare area on an information storage medium via replacement by defect, a DFL entry for indicating a state of the replacement by LOW and a DFL entry for indicating a state of the replacement by defect are discriminated from each other, and link state information is stored in at least one DFL entry.

Figure 2:
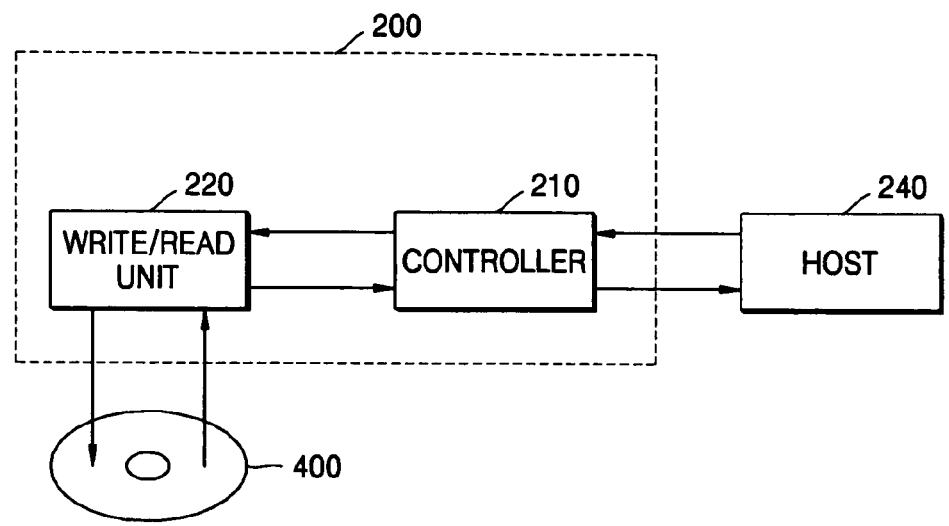
FIG. 2 is a schematic block diagram of an example recording/reproducing apparatus according to an embodiment of the present invention.

Turning now to FIG. 2, a schematic block diagram of an example recording/reproducing apparatus 200 according to an embodiment of the present invention is illustrated. Referring to FIG. 2, the recording/reproducing apparatus 200 includes a write/read unit 220 and a controller 210. For purposes of brevity, the recording/reproducing apparatus 200, albeit in whole or in part, can also be referred to as a drive system which can be internal (housed within a host 240) or external (housed in a separate box that connects to the host 240).

The controller 210 controls the write/read unit 220 to record data on a disk 400, which serves as an information storage medium according to the present embodiment, and read data to reproduce the recorded data from the disk 400. The controller 210 controls the write/read unit 220 to record data by a predetermined recording unit block, or obtains valid data by processing data read by the write/read unit 220.

In a recording operation, the controller 210 controls the write/read unit 220 to record data by performing a logical overwrite (LOW) according to a command of a host 240 or a control of a drive system 200. In the LOW, to update data recorded in a user data area of a disk 400, i.e., a write-once information storage medium, updated data, i.e., replacement data, is recorded in an un-recorded area of the user data area, and address information of the original data and the replacement data can be managed so that the original data and the replacement data have the same logical address (this is performed by storing the address information in a DFL entry and writing the DFL entry on the disk 400). The controller 210 performs replacement by LOW in the un-recorded area of the user data area. The controller 210 also records replacement data in a spare area for replacement by defect.

Figure 3:
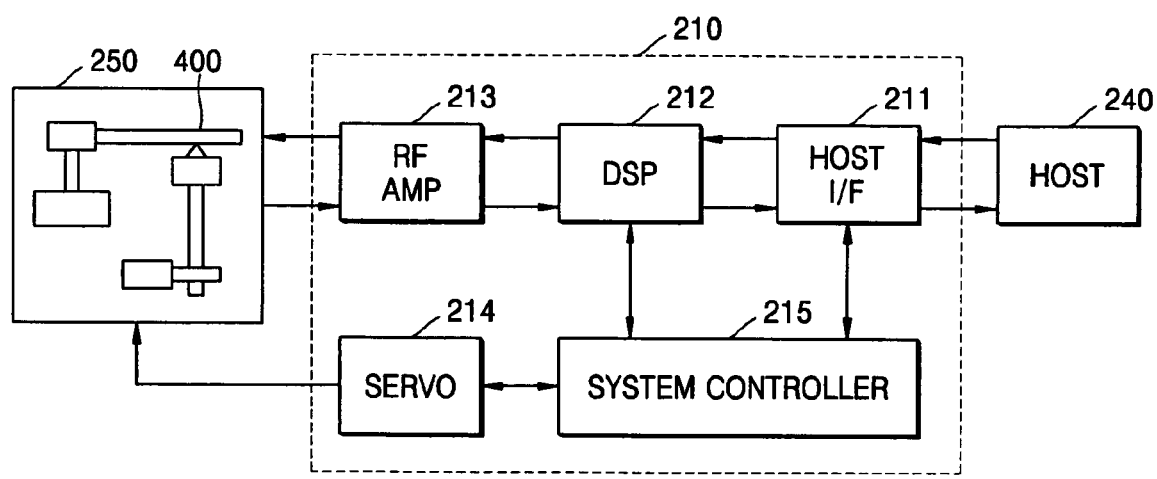
FIG. 3 is a detailed block diagram of the example recording/reproducing apparatus shown in FIG. 2.

FIG. 3 is a detailed block diagram of an example recording/reproducing apparatus 200 shown in FIG. 2.

Referring to FIG. 3, the control unit 210 and the write/read unit 220 of an example recording/reproducing apparatus 200, as shown in FIG. 2, can be implemented using several different components. For example, an optical pickup 250 may serve as the write/read unit 220 to perform read/write operations on an optical disk 400. In addition, a host interface (I/F) 211, a digital signal processor (DSP) 212, a radio frequency amplifier (RF AMP) 213, a servo 214, and a system controller 215 may serve as the control unit 210. In other words, the optical pickup 250 and the system controller 215 respectively correspond to the write/read unit 220 and the controller 210 in FIG. 2.

In a recording operation, the host I/F 211 receives data to be recorded and a write command along with logical address information of the data to be recorded from the host 240 and transmits the same information to the system controller 215.

The system controller 215 receives the write command from the host I/F 211 and performs initialization required for recording.

In particular, according to the first method of the present invention, the system controller 215 controls the write/read unit 220 to record a replacement block by LOW for updating a block recorded on the disk 400 in the user data area of the disk 400 and record a replacement block for replacing a defect block generated on the disk 400 in the spare area of the disk 400. If a defect occurs while an original block recorded in a predetermined area of the disk 400 is being replaced with a first replacement block via replacement by LOW of the original block, the system controller 215 controls the write/read unit 220 to record a second replacement block via replacement by defect of the first replacement block in the spare area of the disk 400, generates a replacement entry (DFL entry) including location information of the original block and location information of the second replacement block to indicate the replacement state, and stores location information of the first replacement block in the second replacement block.

On the other hand, according to the second method of the present invention, the system controller 215 controls the write/read unit 220 to record a replacement block by LOW for updating a block recorded on the disk 400 in the user data area of the disk 400 and to record a replacement block for replacing a defect block occurred on the disk 400 in the spare area of the disk 400. If a defect occurs while an original block recorded in a predetermined area of the disk 400 is being replaced with a first replacement block via replacement by LOW of the original block, the system controller 215 controls the write/read unit 220 to record a second replacement block via replacement by defect of the first replacement block in the spare area of the disk 400, and generates a first DFL entry for indicating a state of the replacement by LOW and a second DFL entry for indicating a state of the replacement by defect due to a defect occurred during the replacement by LOW.

The DSP 212 adds additional data, such as parity bits, for error correction to the data to be recorded that is received from the host I/F 211, generates an ECC block, which is an error correction block, by performing ECC encoding on the data, and modulates the generated ECC block in a predetermined manner. The RF AMP 213 converts the data output from the DSP 212 to an RF signal. The optical pickup 250 records the RF signal output from the RF AMP 213 on the disk 400. The servo 214 receives an input command required for a servo control from the system controller 215 and servo-controls the optical pickup 250.

In a reproducing operation, the host I/F 211 receives a reproduction command from the host 240. The system controller 215 performs initialization required for the reproduction.

In particular, according to the first method of the present invention, the system controller 215 converts a logical address according to a reproduction command to a physical address, obtains a replacement address from a DFL entry based on the physical address, and controls the write/read unit 220 to read a replacement block recorded at a corresponding location. If error correction of the read replacement block fails, the system controller 215 obtains a location of a previous replacement block from an additional information portion included in the replacement block, controls the write/read unit 220 to read a replacement block recorded at the location of the previous replacement block, and reproduces the read replacement block.

On the other hand, according to the second method of the present invention, the system controller 215 converts a logical address according to a reproduction command to a physical address and seeks a DFL entry based on the converted physical address. If link state information is set in a first DFL entry related to data to be reproduced, the system controller 215 controls the write/read unit 220 to read a replacement block recorded at a location corresponding to replacement location information included in a second DFL entry linked to the first DFL entry. If reproduction of the read replacement block fails, the system controller 215 controls the write/read unit 220 to read a replacement block recorded at a location corresponding to replacement location information included in the first DFL entry, and reproduces the read replacement block.

The optical pickup 250 radiates a laser beam on the disk 400 and outputs an optical signal obtained by receiving the laser beam reflected from the disk 400. The RF AMP 213 converts the optical signal output from the optical pickup 250 to an RF signal, provides modulated data obtained from the RF signal to the DSP 212, and provides a servo control signal obtained from the RF signal to the servo 214. The DSP 212 demodulates the modulated data and outputs data obtained through ECC error correction.

The servo 214 servo controls of the optical pickup 250 based on the servo signal received from the RF AMP 213 and the command required for the servo control received from the system controller 215. The host I/F 211 transmits the data received from the DSP 212 to the host 240.

Figure 4:
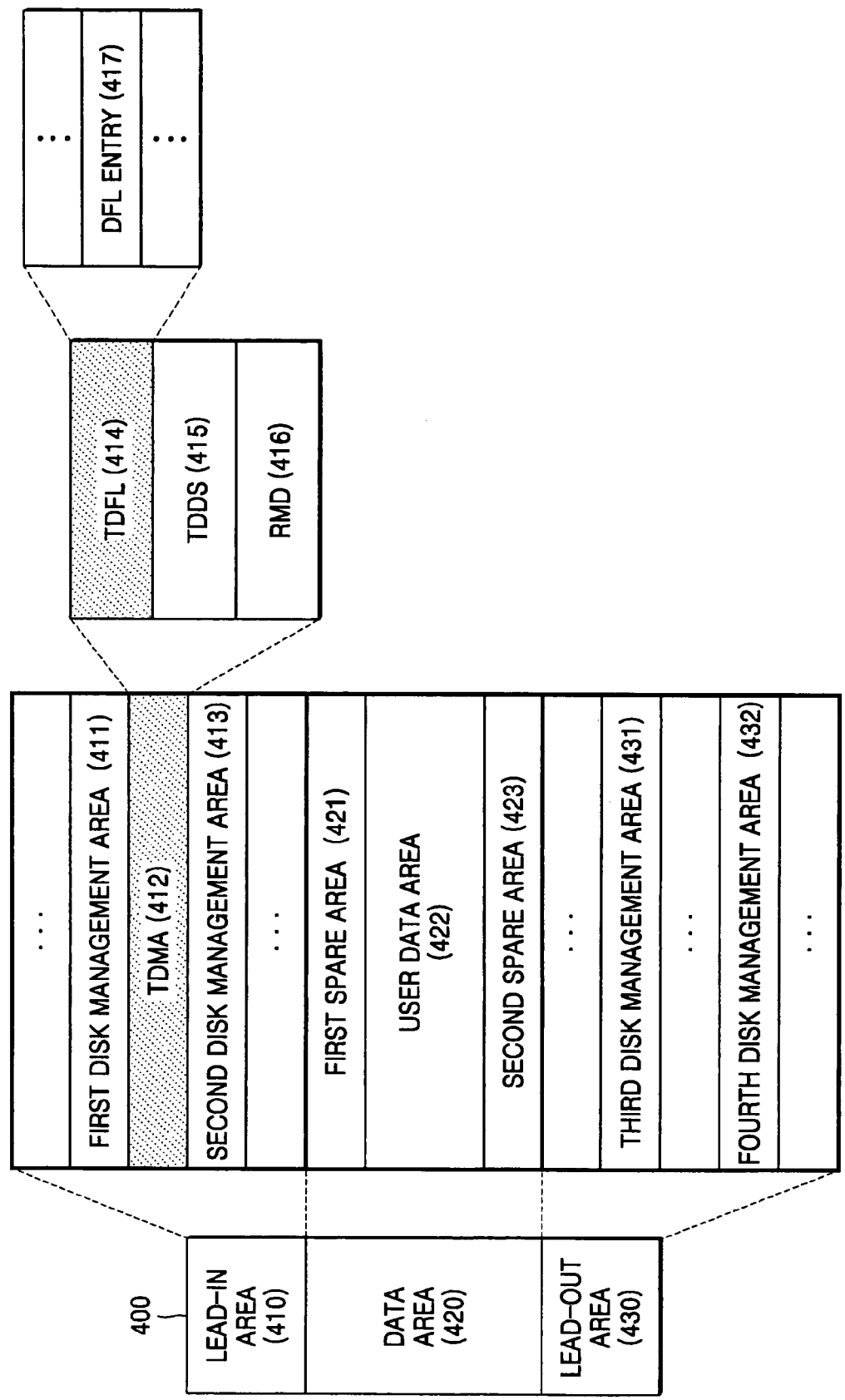
FIG. 4 is a structural diagram of an example information storage medium according to an embodiment of the present invention.

FIG. 4 is a structural diagram of an information storage medium according to an embodiment of the present invention.

Referring to FIG. 4, a structure of data recorded on an optical disk 400 serving as a write-once information storage medium including a lead-in area 410, a data area 420, and a lead-out area 430.

The lead-in area 410 includes a first disk management area 411, a temporary disk management area (TDMA) 412, and a second disk management area 413. The first and second disk management areas 411 and 413 are provided to record information regarding one or more defects occurring in the data area 420. In contrast to the lead-in area 410, the lead-out area 430 only includes a third disk management area 431 and a fourth disk management area 432, and not a temporary disk management area (TDMA).

The TDMA 412 included in the lead-in area 410 is an area used to record information on temporary defect management and temporary disk management of the write-once information storage medium 400.

The TDMA 412 includes a temporary defect list (TDFL), also known as a DFL entry list 414, a temporary disk definition structure (TDDS) 415 and a recording management data (RMD) 416.

The temporary defect list (TDFL) 414 indicates information on temporary defects and includes location information of defect data and location information of replacement data for replacing defect data. In particular, according to various embodiments of the present embodiment, the TDFL 414 includes a replacement (DFL) entry 417 for indicating a state of the replacement by defect or a state of the replacement by LOW.

The temporary disk definition structure (TDDS) 415 includes location pointers of the TDFL 414 and a drive area, and further includes location and size information of spare areas 421 and 423 assigned in an initializing operation, write protection information, location and size information of a temporary defect management area assigned in the data area 420, information on the user data area 422, information on a replaceable location in each spare area, and last recorded address information of the user data area 422.

The RMD 416 is information indicating whether the user data area 422 is recorded by representing whether each cluster of the user data area 422 is recorded using a bit value.

A first disk management area 413, a second disk management area 411, a third disk management area 431 and a fourth disk management area 432 are areas provided to record final disk management information when the write-once information storage medium 400 is finalized.

The data area 420 sequentially includes a first spare area 421, the user data area 422, and a second spare area 423.

The first and second spare areas 421 and 423 are areas provided to record replacement data for replacing data recorded in the user data area 422. According to the present embodiment, replacement data for replacement by defect is recorded in the spare areas 421 and 423.

The user data area 422 is an area provided to record user data. In particular, according to various embodiments of the present embodiment, replacement data for replacing user data by LOW is recorded in the user data area 422. The user data area 422 can be divided into a plurality of small areas in which addition of user data and the LOW are possible, and since the replacement by LOW is limited to the user data area 422, an area for the replacement by defect is discriminated from an area for the replacement by LOW. In other words, if a replacement block exists in the user data area 422, such a replacement block is used for replacement by LOW. However, if a replacement block exists in the spare area 421 or 423, such a replacement block is used for replacement by defect.

Figure 5:
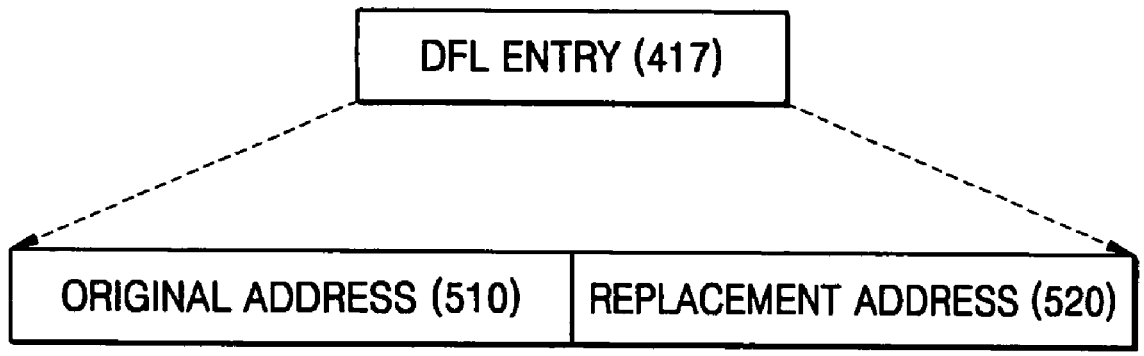
FIG. 5 is a structural diagram of a DFL entry according to a first embodiment of the present invention.

FIG. 5 is a structural diagram of the DFL entry 417 according to a first embodiment of the present invention.

Referring to FIG. 5, the DFL entry 417 includes an original address 510 and a replacement address 520.

The original address 510 indicates an address in a physical space of an original recording block, and the replacement address 520 indicates an address in a physical space of a replacement recording block. That is, it is preferable that the original address 510 be a physical address corresponding to a logical address in a recording command of a host. Similarly, it is preferable that the replacement address 520 be a physical address of a finally replaced replacement block. In other words, according to the first embodiment of the present invention, if a second replacement block for replacing a first replacement block in which a defect occurs is recorded in a spare area 421 or 423 on an information storage medium 400 due to the defect occurred while the first replacement block is being recorded for replacing an original recording block via replacement by LOW, the original address 510 of a DFL entry 417 for indicating this replacement state is an address of the original recording block, and the replacement address 520 is an address of the second replacement block.

Figure 6:
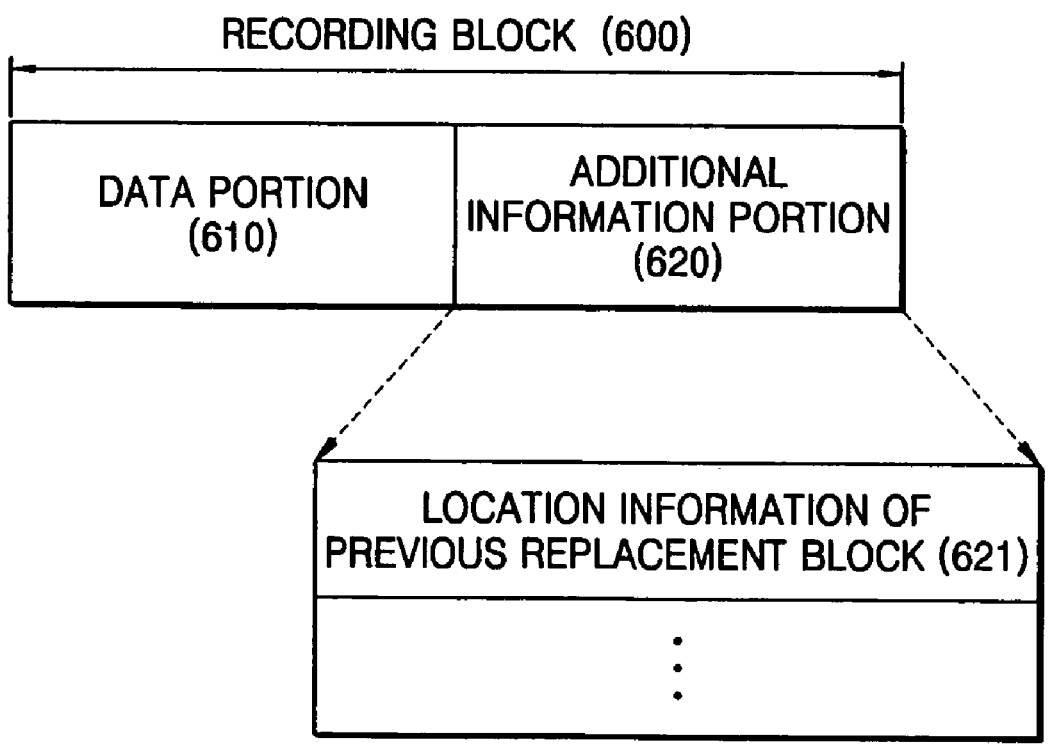
FIG. 6 is a structural diagram of a recording unit block according to the first embodiment of the present invention.

FIG. 6 is a structural diagram of an example recording block 600 according to the first embodiment of the present invention.

Referring to FIG. 6, the recording block 600 includes a data portion 610 and an additional information portion 620.

The data portion 610 is provided to contain user data. The additional information portion 620 is provided to contain additional information of the user data. According to the first embodiment of the present invention, the additional information portion 620 includes location information of a previous replacement block 621. However, it is preferable that the additional information portion 620 have an error correction structure different from that of data portion 610, and that the recording block 600 be recorded so that error correction capability of the additional information portion 620 is better than error correction capability of the data portion 610.

That is, according to the first embodiment of the present invention, since an example recording block can be divided into an error correction block for user data and an error correction block for additional information, it is preferable that the error correction block for additional information be error-correctable even if the error correction block for user data cannot be error-corrected. For example, in the case of the LDC cluster for user data and the BIS cluster for additional information according to the Blu-ray ECC format, it is preferable that error correction capability of the BIS cluster be excellent.

Figure 7:
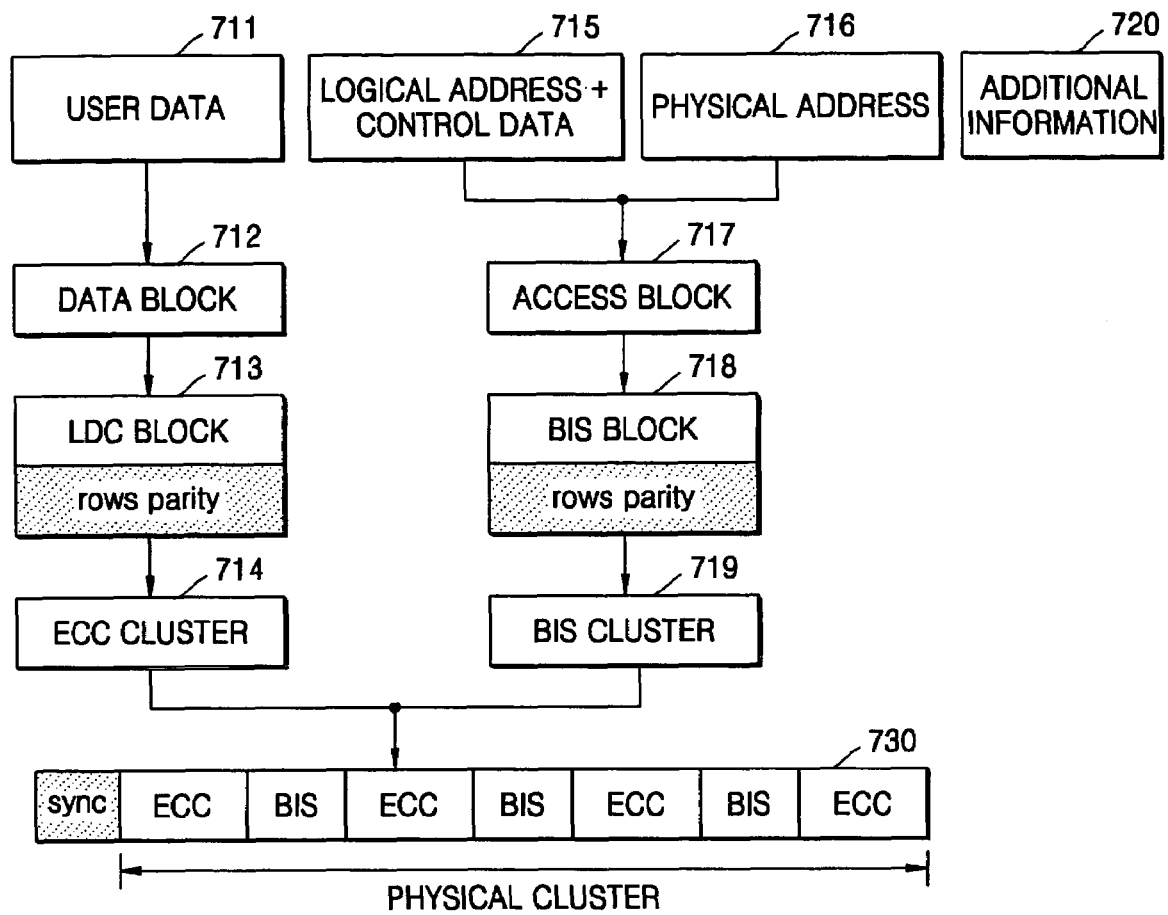
FIG. 7 is a detailed example of the recording unit block illustrated in FIG. 6.

FIG. 7 is a detailed example of the recording block 600 illustrated in FIG. 6, encoded using an interleaving encoding method.

In the interleaving encoding method, a block including user data, called an LDC block, and a block including address data, called a BIS block, are arranged interleavingly and recorded in a data area 420 on an information storage medium 400, as shown, for example, in FIG. 4. In a reproducing operation, the block including address data is error-corrected and then the block including user data is error-corrected.

Referring to FIG. 7, user data 711 can be divided into a plurality of data frames. The user data 711 forms a data block 712, and an LDC block 713 is formed by adding a predetermined number of row parities to the data block 712. The LDC block 713 constitutes an ECC cluster 714 according to a predetermined arrangement. The ECC cluster 714 can be distributed in ECC portions of a physical cluster block 730.

An access block 717 can be formed by combining a logical address and control data 715 combined by a recording system, a physical address 716 related to a physical location of user data on an information storage medium, and additional information 720 according to various embodiments of the present embodiment. A BIS block 718 is formed by adding a predetermined number of row parities to the access block 717. The BIS block 718 constitutes a BIS cluster 719 according to a predetermined arrangement. The BIS cluster 719 can be distributed in BIS columns of the physical cluster block 730. A physical cluster is formed by adding a synchronization bit group of one column to the physical cluster block 730. As described above, error correction capability can be improved by arranging data according to the interleaving encoding method, and in particular, the error correction capability of the additional information portion 620 can be improved to be better than that of the data portion 610.

Figure 8:
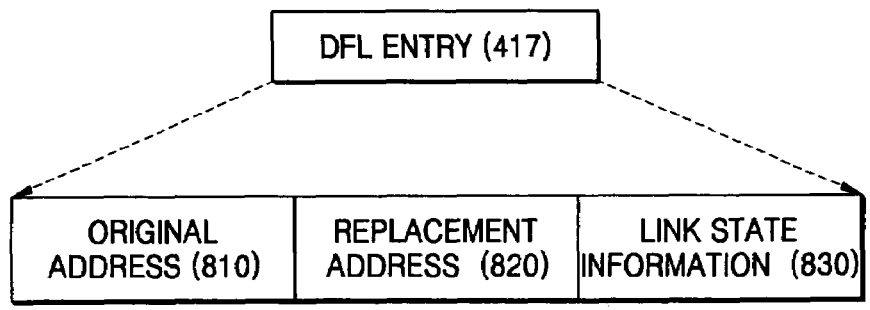
FIG. 8 is a structural diagram of a DFL entry according to a second embodiment of the present invention.

FIG. 8 is a structural diagram of a DFL entry 417 according to a second embodiment of the present invention.

Referring to FIG. 8, the DFL entry 417 includes an original address 810, a replacement address 820, and link state information 830.

According to the second embodiment, a defect occurs while a first replacement block is being recorded to replace an original recording block via replacement by LOW, and if a second replacement block to replace the first replacement block in which the defect occurs is recorded in a spare area 421 or 423 on an information storage medium 400, a DFL entry for indicating the replacement by LOW and a DFL entry for indicating the replacement by defect are generated to indicate such replacement states.

It is preferable that the original address 810 be a physical address corresponding to a logical address in a recording command of a host or a physical address of a defect block occurred during the replacement, and it is preferable that the replacement address 820 be a physical address of a finally replaced replacement block or a physical address of a defect block occurred during the replacement.

The link state information 830 is information indicating whether the DFL entry 417 is linked to another DFL entry.

A method according to the first embodiment and a method according to the second embodiment will now be described in detail.

Figure 9A:
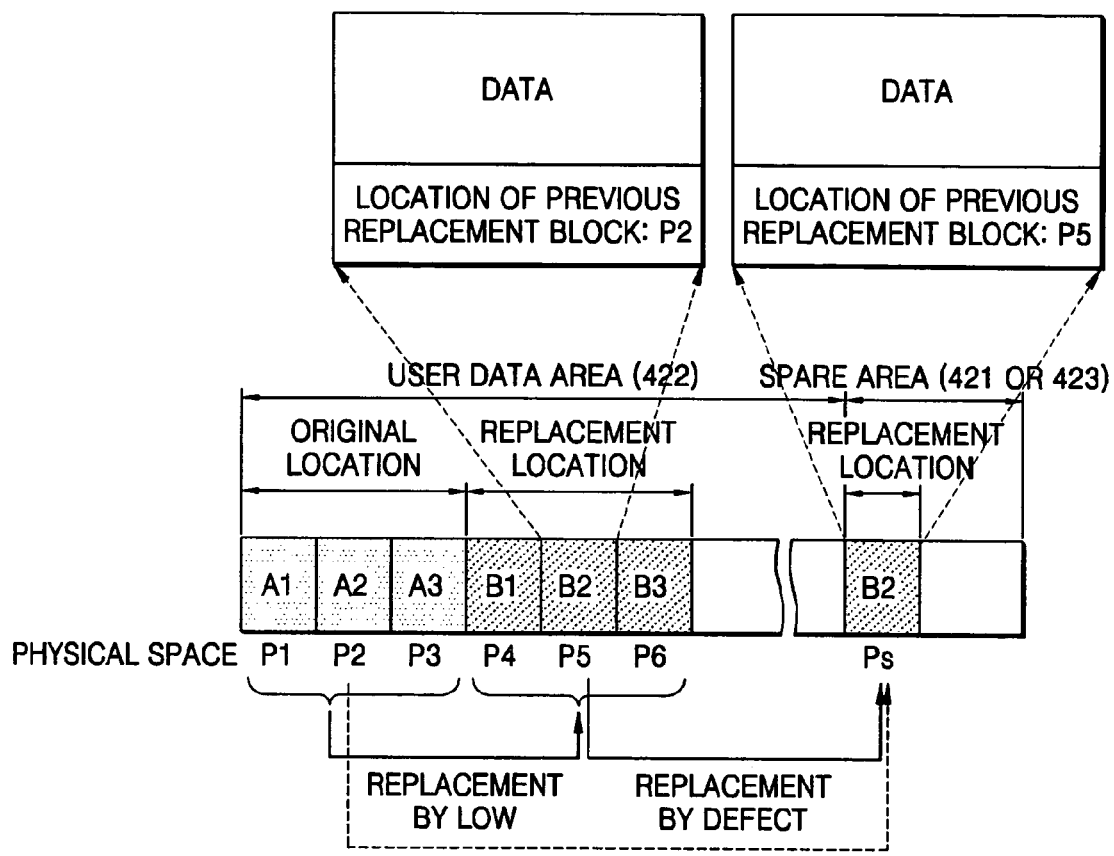
FIG. 9A is an illustrative diagram of a defect management method according to the first embodiment of the present invention.

FIG. 9A is an illustrative diagram of a replacement process when a defect occurs during the replacement by LOW according to the first embodiment of the present invention.

Referring to FIG. 9A, a defect is detected from a P5 block while updated data blocks B1, B2, and B3 with which data blocks A1, A2 and A3 recorded in physical spaces P1, P2, and P3 in a user data area 422 on an information storage medium 400, as shown in FIG. 4, are replaced are being recorded in physical spaces P4, P5, and P6 according to the replacement by LOW. Then the data B2 recorded in the physical space P5 is replaced in a physical space Ps according to the replacement by defect.

Figure 9B:
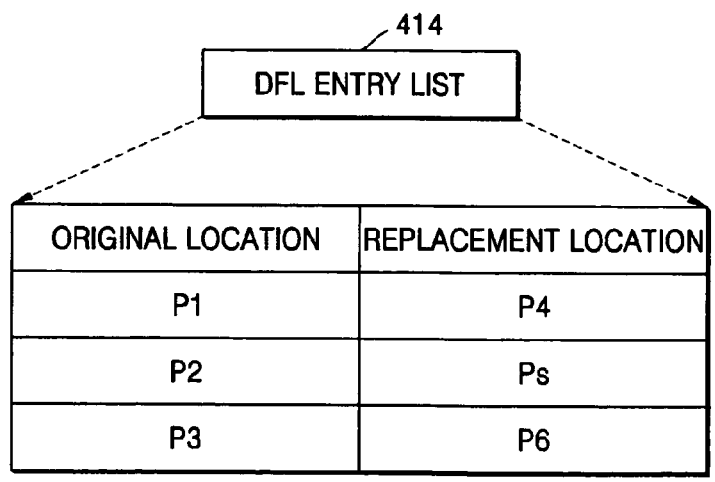
FIG. 9B is a diagram of a DFL entry list according to the management method illustrated in FIG. 9A.

Referring to FIG. 9B, a DFL entry (P2->Ps) is generated to indicate that P2 is finally replaced with Ps. Here, DFL entries indicating that P1 and P3 are replaced with P4 and P6, respectively, are also generated and stored in the DLF entry list 414, as shown in FIG. 4.

In this situation, to indicate that a previous replacement block of the Ps block is the P5 block, location information of the P5 block is stored in an additional information portion of the Ps block. By doing this, if a host commands a drive system to reproduce data recorded at a logical address corresponding to P2 on a medium in order to reproduce the data B2 in the future, the drive system recognizes from the DFL entry that the physical address P2 corresponding to the logical address has been replaced with the physical address Ps and reproduces the Ps block recorded in the spare area 421 or 423, as shown, for example, in FIG. 4. If the user data B2 recorded in the Ps block cannot be reproduced, the drive system recognizes that the replacement block Ps is a block replaced due to the replacement by defect since the replacement block Ps is recorded in the spare area 421 or 423, and then recognizes that user data of a previous replacement block is the same as user data of the Ps block. Accordingly, the drive system obtains location information of the previous replacement block stored in the additional information portion of the Ps block, recognizes that the location information is P5, accesses the P5 block, and reproduces user data of the P5 block.

Figure 10A:
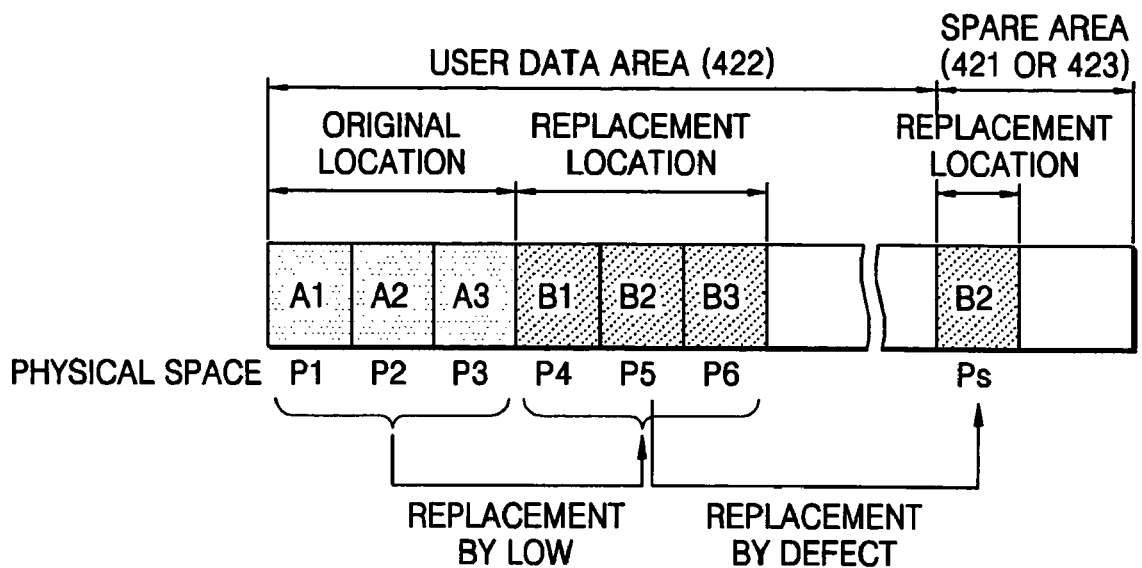
FIG. 10A is an illustrative diagram of a defect management method according to the second embodiment of the present invention.

FIG. 10A is an illustrative diagram of a replacement process when a defect occurs during the replacement by LOW according to the second embodiment of the present invention.

In contrast to the first embodiment illustrated in FIG. 9A, two DFL entries are used to indicate that the original location P2 on the information storage medium 400, as shown, for example, in FIG. 4, is finally replaced with Ps through P5. That is, since P2 is replaced with P5 according to the replacement by LOW and P5 is replaced with Ps according to the replacement by defect, two different DFL entries are used to discriminate the two replacement states from each other, and their link state is indicated using link state information.

Figure 10B:
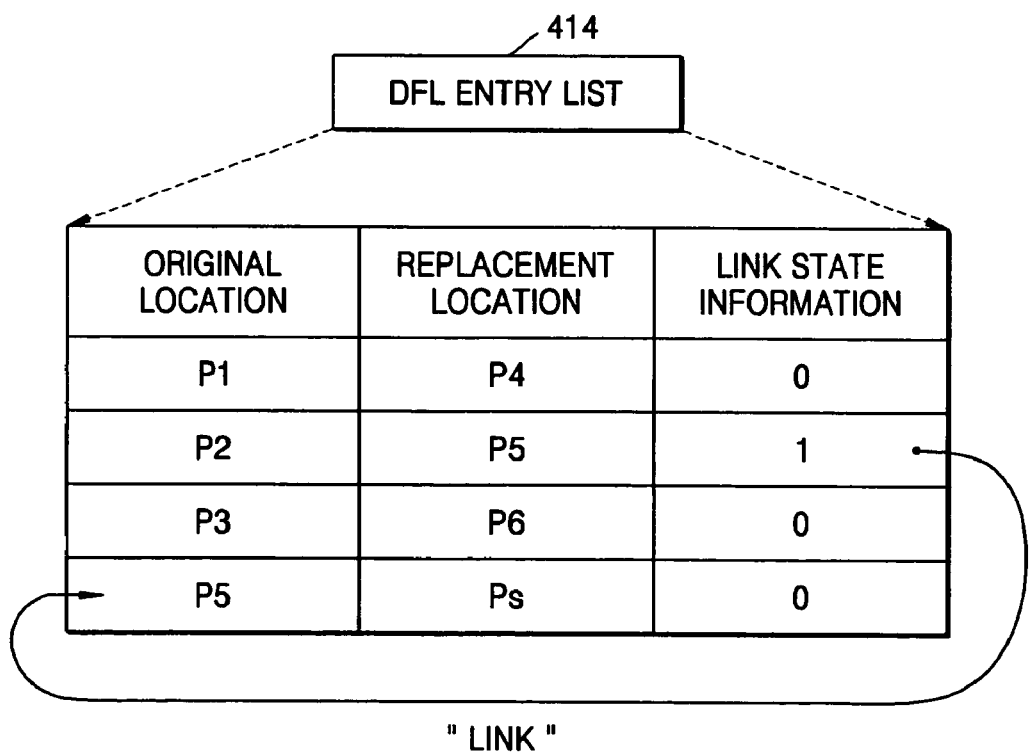
FIG. 10B is a diagram of a DFL entry list according to the management method illustrated in FIG. 10A.

Referring to FIG. 10B, a drive system generates a DFL entry (P2->P5) to indicate that P2 is replaced with P5, sets the link state information to "1" to indicate that the DFL entry is linked to another DFL entry in the DFL entry list 414, and generates the other DFL entry (P5→Ps) to indicate that P5 is replaced with Ps.

By doing this, if a host commands the drive system to reproduce data at a logical address corresponding to the original location P2 on the information storage medium 400 to read the data B2, the drive system recognizes from the DFL entry (P2->P5) that the physical address P2 corresponding to the logical address is replaced with P5 and that the link state information is set to "1", seeks the DFL entry (P5->Ps) in which P5 is stored in an original address field, recognizes that P5 is finally replaced with Ps, reproduces the Ps block, and transmits the data B2 stored in the Ps block to the host. If the Ps block cannot be reproduced due to a defect, since the drive system recognizes from the DFL entry (P5->Ps) that the Ps block is a replacement block recorded in the spare area 421 or 423, as shown, for example, in FIG. 4, and that user data stored in the P5 block is the same as user data stored in the Ps block, the drive system can reproduce the P5 block and transmits the data B2 stored in the P5 block to the host.

Figure 11A:
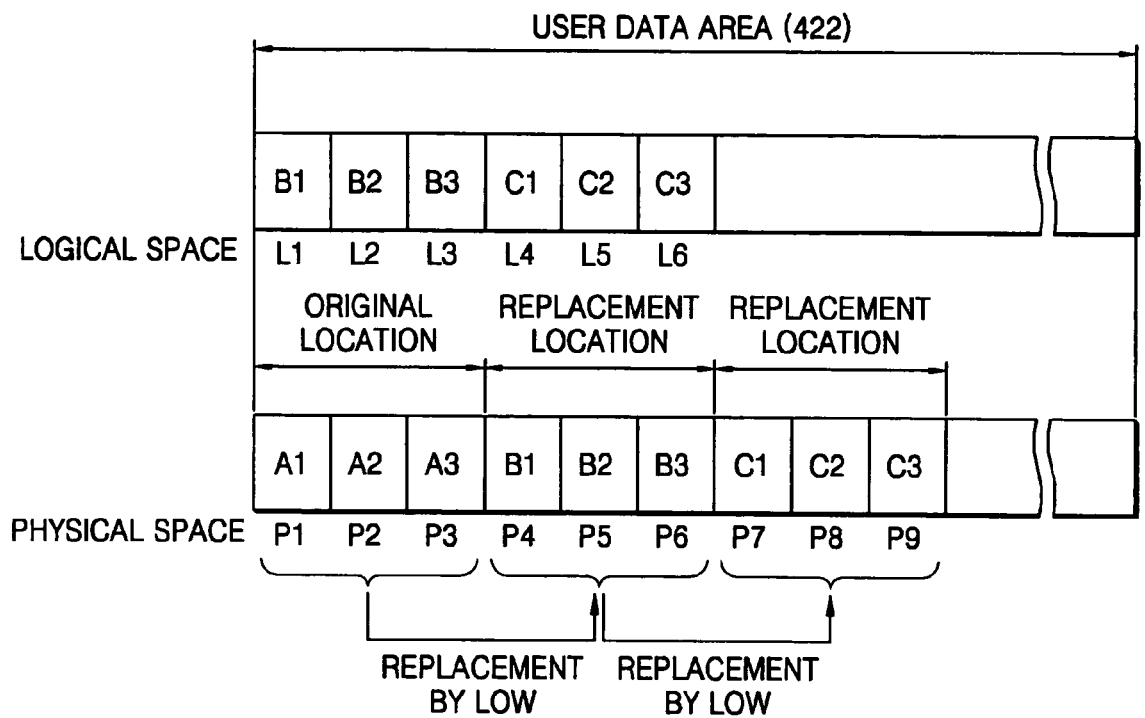
FIG. 11A is an illustrative diagram of a method of managing two unlinked DFL entries according an embodiment of the present invention.

Here, whereas the link state information is necessary in the DFL entries to discriminate whether each DFL entry is linked, two unlinked DFL entries will now be described with reference to FIGS. 11A and 11B as follows.

When the replacement by LOW is performed in the user data area 422 on an information storage medium 400, as shown, for example, in FIG. 4, an area replaced according to the replacement by LOW can be physically but not logically recorded. That is, if the host tries to update the data blocks B1, B2, and B3 at logical addresses L1, L2, and L3 according to the replacement by LOW as illustrated in FIG. 11A, and since data has previously been recorded at the physical addresses P1, P2, and P3 corresponding to the logical addresses, the drive system records the data blocks B1, B2, and B3 at the physical addresses P4, P5, and P6 by replacing P1, P2, and P3 with P4, P5, and P6, and generates a DFL entry (P1:P3->P4:P6) in a DFL entry list 414 to indicate the replacement state as shown in FIG. 11B. Here, since logical addresses L4, L5, and L6 corresponding to the physical addresses P4, P5, and P6 are un-recorded recorded areas even though the physical addresses P4, P5, and P6 are physically recorded areas, the host can use the logical addresses L4, L5, and L6. Thus, if the host tries to record data blocks C1, C2, and C3 at the logical addresses L4, L5, and L6, and since data has already been recorded at the physical addresses corresponding to the logical addresses, the drive system records the data blocks C1, C2, and C3 at physical addresses P7, P8, and P9 by replacing P4, P5, and P6 with P7, P8, and P9 according to the replacement by LOW, and generates a DFL entry (P4:P6->P7:P9) in the DFL entry list 414 to indicate the replacement state as shown in FIG. 11B.

As described above, when the replacement by LOW is performed in the user data area 422, physical addresses stored in a replacement address field of a DFL entry can be stored in an original address field of another DFL entry. In this case, the two DFL entries should not be linked to each other.

Figure 11B:
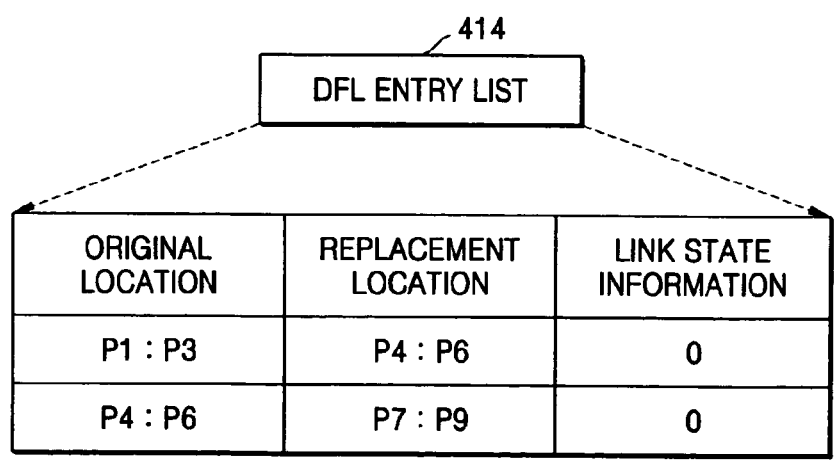
FIG. 11B is a diagram of a DFL entry list according to the method illustrated in FIG. 11A.

Thus, according to the second embodiment, the DFL entry (P1:P3->P4:P6) can indicate that the two DFL entries are not linked to each other by setting its link state information to "0" as shown in FIG. 11B. According to the first embodiment, for a DFL entry, a physical address corresponding to a logical address should always be stored in an original address field of the DFL entry, and a physical address corresponding to a final replacement block should always be stored in a replacement address field of the DFL entry.

Figure 12A:
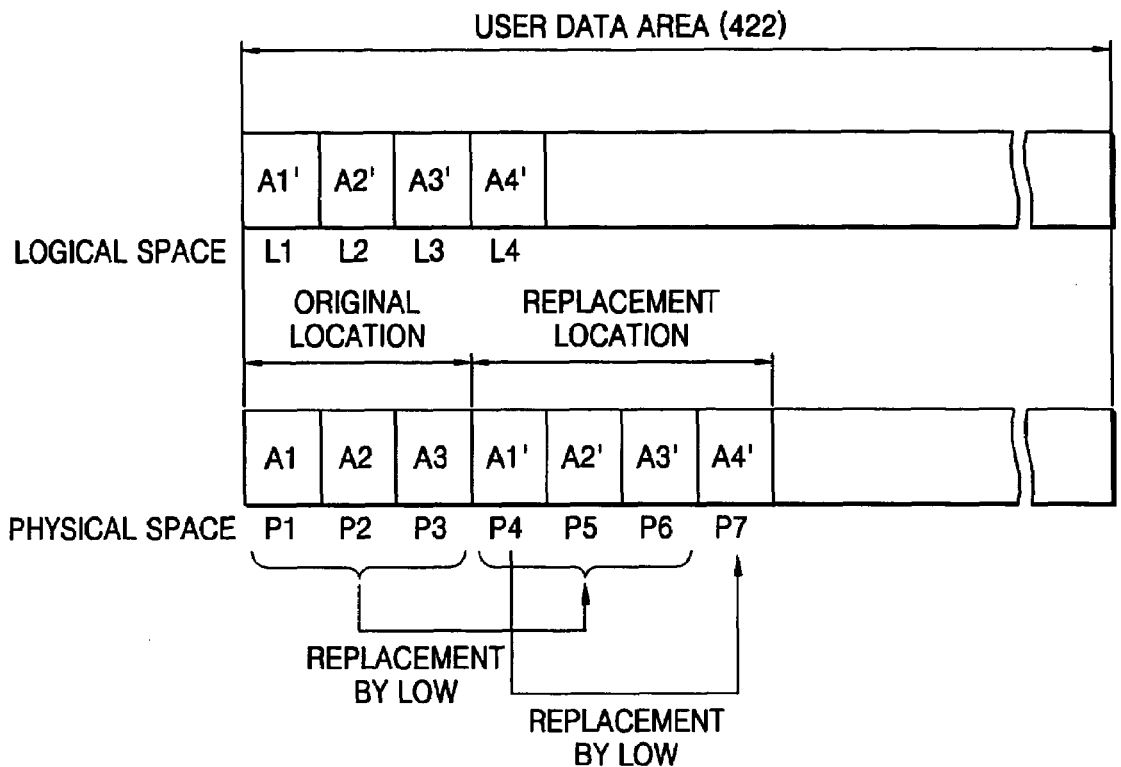
FIG. 12A is an illustrative diagram of a state where a physical address in a replacement address field of a DFL entry is stored in an original address field of another DFL entry according to an embodiment of the present invention.

FIG. 12A illustrates another example wherein a physical address stored in a replacement address field of a DFL entry is stored in an original address field of another DFL when the replacement by LOW takes place in the user data area 422.

Figure 12B:
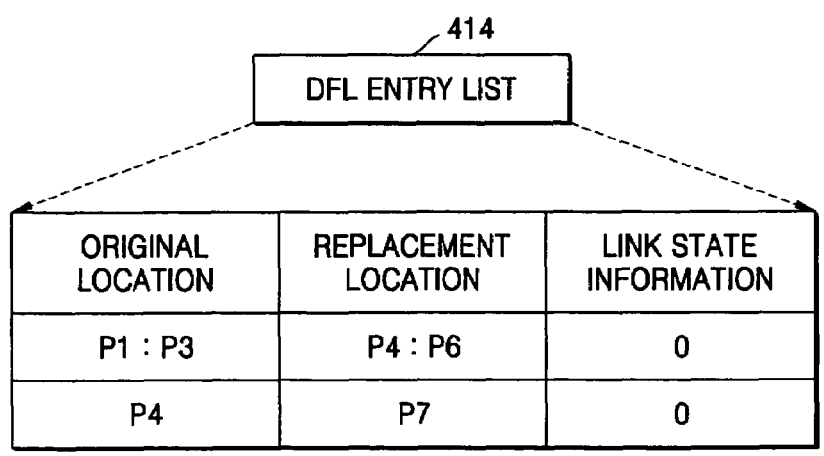
FIG. 12B is a diagram of a DFL entry list according to the state illustrated in FIG. 12A.

Referring to FIG. 12A, when data blocks A1, A2, and A3 recorded in physical spaces P1, P2, and P3 in the user data area 422 on an information storage medium 400, as shown, for example, in FIG. 4, are replaced by the replacement by LOW, updated data blocks A1', A2', A3', and A4' are recorded in physical spaces corresponding to logical spaces L1, L2, L3, and L4 from a physical space P4 due to an increase of the data amount. In this case, a drive system records the updated data blocks A1', A2', A3', and A4' in the physical spaces P4, P5, P6, and P7 by the replacement by LOW and generates a DFL entry (P1:P3->P4:P6) and a DFL entry (P4->P7) as shown in FIG. 12B. Here, though P4 was an un-recorded area before A1' is recorded in P4, and since it is determined that P1 is replaced with P4 before A4' is recorded in P4 corresponding to L4, P4 is considered as an area physically but not logically recorded. Thus, in this case, a physical address stored in a replacement address field of a DFL entry is stored in an original address field of another DFL entry as shown in FIG. 12B. Though the second embodiment of the present invention is represented in FIG. 12B, the DFL entries can also be implemented according to the first embodiment of the present invention.

Figure 13:
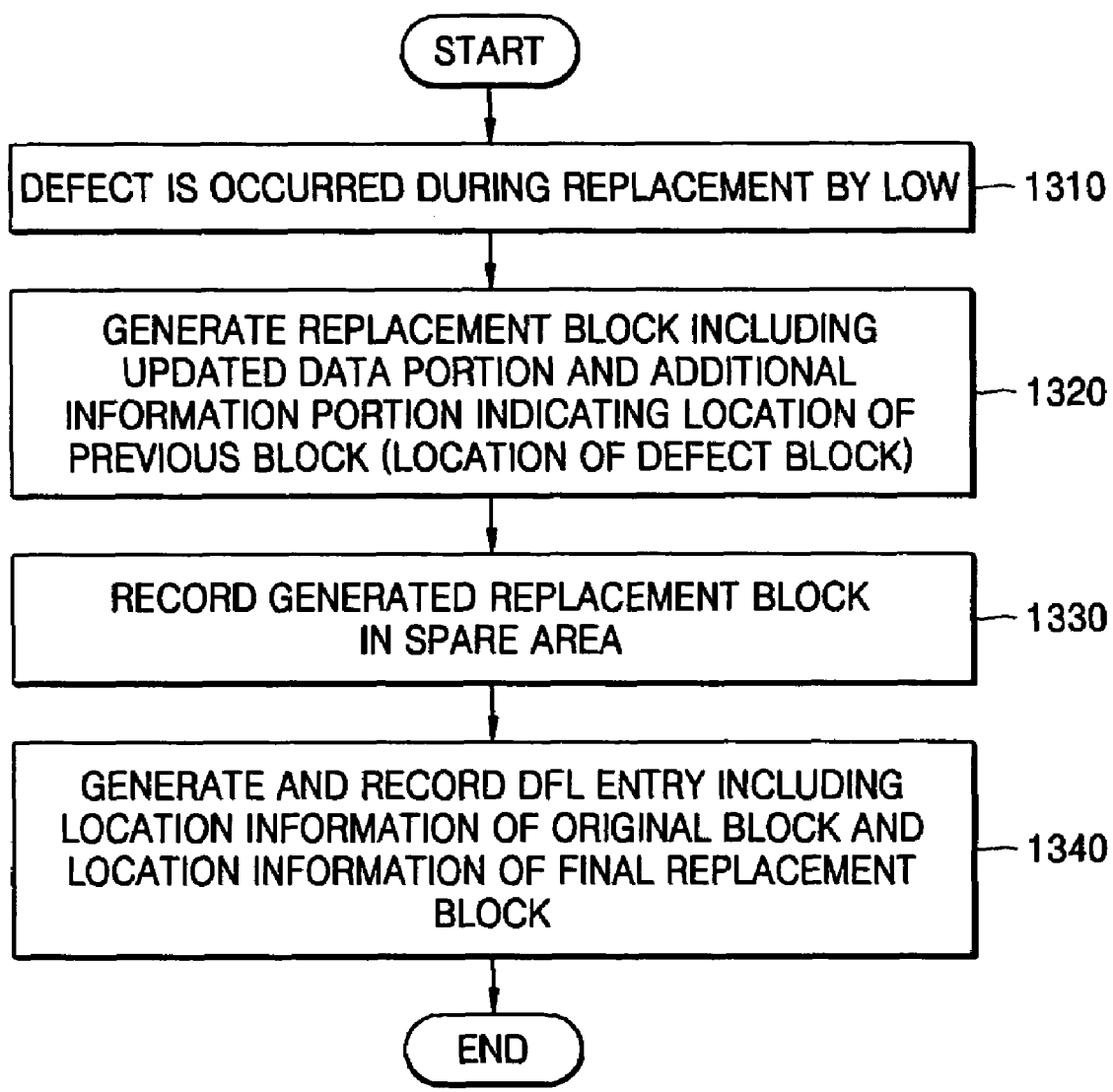
FIG. 13 is a flowchart illustrating an example recording process according to the first embodiment of the present invention.

FIG. 13 is a flowchart illustrating an example recording process according to the first embodiment of the present invention.

Referring to FIG. 13, when a defect occurs during the replacement by LOW in operation 1310, a drive system generates a replacement block including a data portion updated by the LOW and an additional information portion indicating a location of a previous block (location of a defect block) in operation 1320.

The drive system records the generated replacement block in a spare area 421 or 423 on an information storage medium 400 in operation 1330.

The drive system generates a DFL entry including location information of an original block and location information of a final replacement block, and records the DFL entry in the DFL entry list 414 on the information storage medium 400 in operation 1340.

Figure 14:
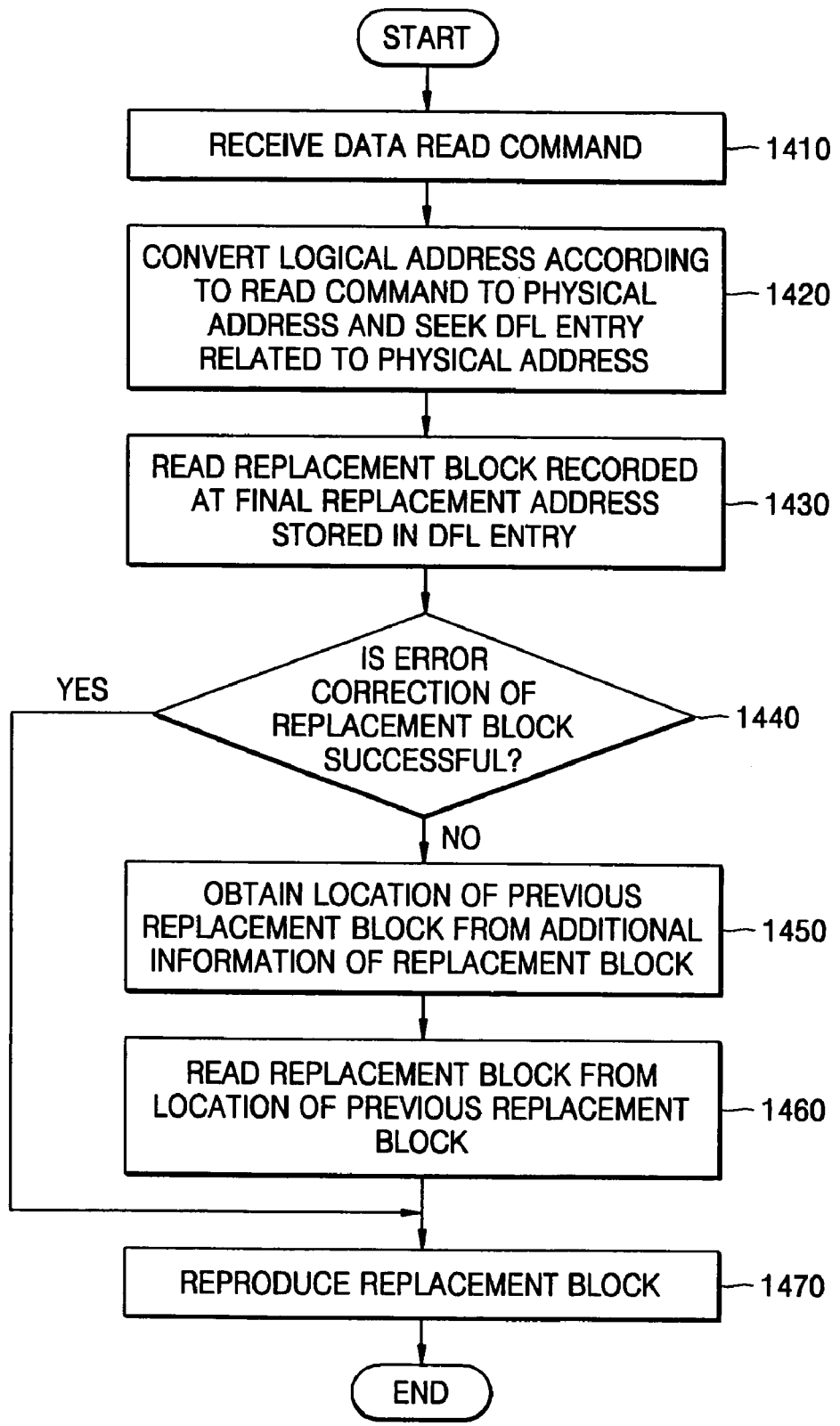
FIG. 14 is a flowchart illustrating an example reproducing process according to the first embodiment of the present invention.

FIG. 14 is a flowchart illustrating an example reproducing process according to the first embodiment of the present invention.

Referring to FIG. 14, a drive system receives a data reproduction command from a host in operation 1410.

The drive system converts a logical address according to the reproduction command to a physical address, and seeks a DFL entry related to the physical address in operation 1420.

The drive system reads a replacement block recorded at a final replacement address stored in the DFL entry in operation 1430.

The drive system determines whether error correction of the replacement block is successful in operation 1440. If the error correction of the replacement block is successful, the drive system reproduces the replacement block in operation 1470.

If the error correction of the replacement block is not successful, the drive system obtains a location of a previous replacement block from additional information of the replacement block in operation 1450. As described with reference to the first embodiment of the present invention, a recording block can be divided, as shown in FIG. 6, into a data portion and an additional information portion including location information of the previous replacement block. In addition, since data is recorded so that an error correction capability of the additional information portion is higher than that of the data portion, and even if error correction of the data portion fails, if error correction of the additional information portion is possible, the location of the previous replacement block can be extracted.

The drive system reads a replacement block recorded at the location of the previous replacement block in operation 1460, and reproduces the replacement block in operation 1470.

Figure 15:
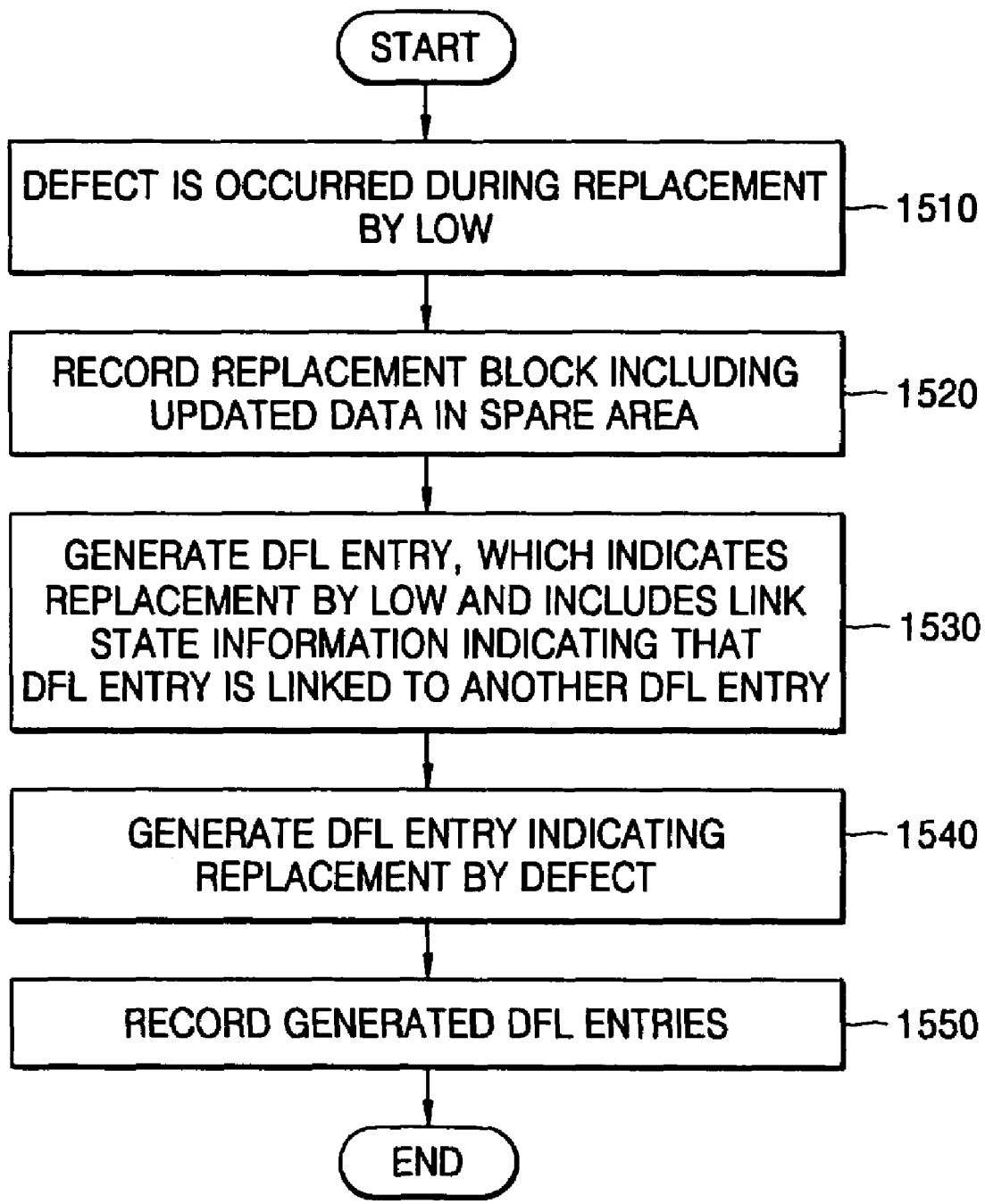
FIG. 15 is a flowchart illustrating an example recording process according to the second embodiment of the present invention.

FIG. 15 is a flowchart illustrating an example recording process according to the second embodiment of the present invention.

Referring to FIG. 15, when a defect occurs during the replacement by LOW in operation 1510, a drive system records a replacement block including updated data in a spare area 421 or 423 on an information storage medium 400, as shown, for example, in FIG. 4, in operation 1520.

The drive system generates a DFL entry, which indicates the replacement by LOW and includes link state information indicating that the DFL entry is linked to another DFL entry, in operation 1530. The drive system also generates a DFL entry indicating the replacement by defect in operation 1540.

The drive system records the generated DFL entries in a DFL entry list 414 on an information storage medium 400, in operation 1550.

Figure 16:
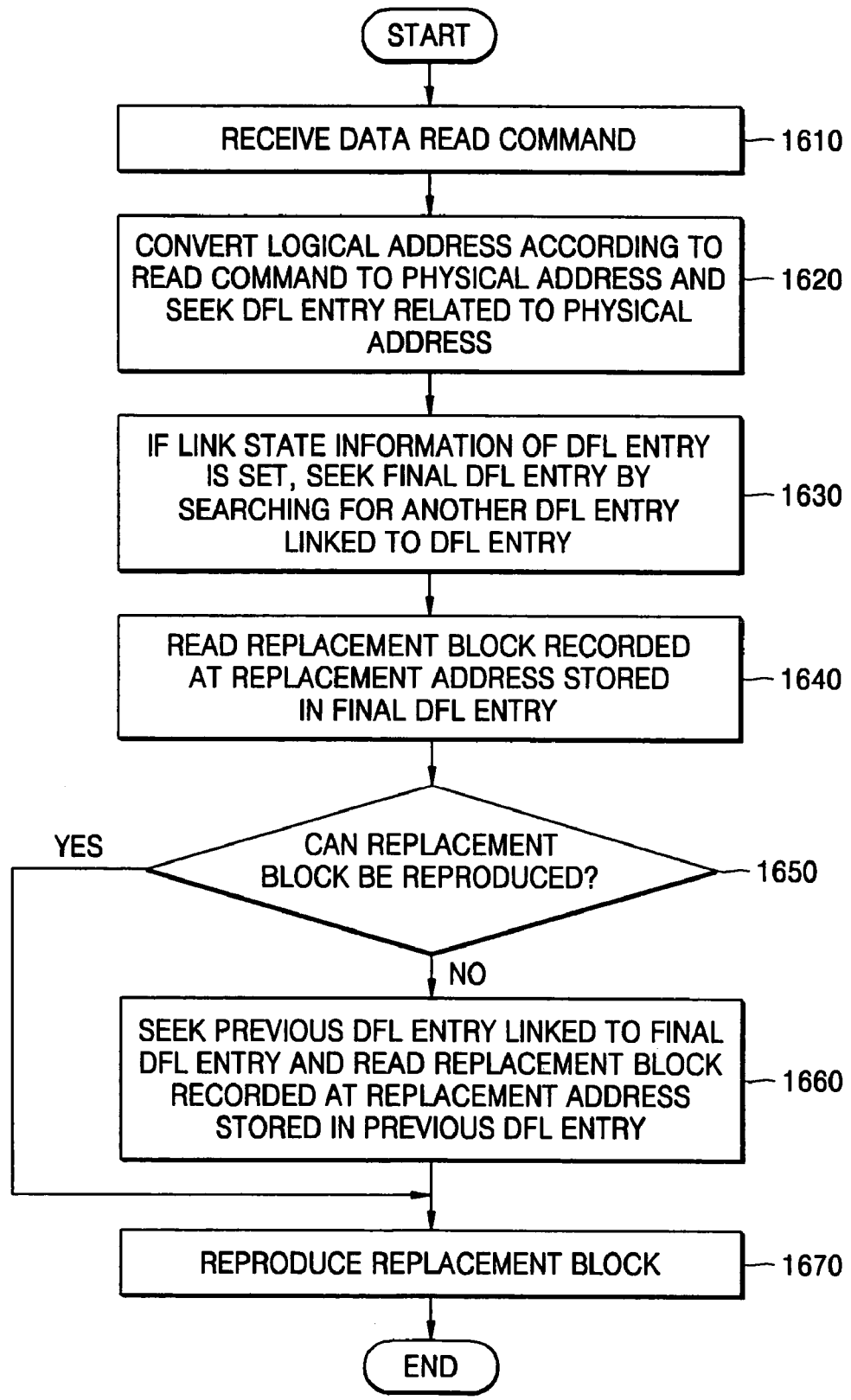
FIG. 16 is a flowchart illustrating an example reproducing process according to the second embodiment of the present invention.

FIG. 16 is a flowchart illustrating an example reproducing process according to the second embodiment of the present invention.

Referring to FIG. 16, a drive system receives a data reproduction command from a host in operation 1610.

The drive system converts a logical address according to the reproduction command to a physical address and seeks a DFL entry related to the physical address in operation 1620.

If link state information of the DFL entry is set, the drive system seeks a final DFL entry by searching for another DFL entry linked to the DFL entry in operation 1630.

The drive system reads a replacement block recorded at a replacement address stored in the final DFL entry in operation 1640.

If the read replacement block can be reproduced in operation 1650, the drive system reproduces the replacement block in operation 1670.

If the read replacement block cannot be reproduced, the drive system seeks a previous DFL entry linked to the final DFL entry and reads a replacement block recorded at a replacement address stored in the previous DFL entry in operation 1660 and reproduces the replacement block in operation 1670.

As described from the foregoing, the present invention advantageously provides techniques in which an area on an information storage medium for replacement by defect and an area on the information storage medium for replacement by LOW are discriminated from each other, data reproduction efficiency can be maximized.

Various aspects and embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, DVDs, etc.). The computer readable recording medium can also be distributed over network coupled computer systems so that the computer readable code is stored and executed in a distributed fashion. And the functional programs, codes and code segments for embodying the present invention may be easily deducted by programmers in the art which the present invention belongs to.

Various aspects and embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, DVDs, etc.). The computer readable recording medium can also be distributed over network coupled computer systems so that the computer readable code is stored and executed in a distributed fashion. And the functional programs, codes and code segments for embodying the present invention may be easily deducted by programmers in the art which the present invention belongs to.

While there have been illustrated and described what are considered to be example embodiments of the present invention, it will be understood by those skilled in the art that various changes in form and modification may be made therein, and equivalents may be substituted for elements thereof without departing from the spirit and scope of the present invention. For example, other computer readable media such as read-only memory (ROM), random-access memory (RAM), CD-ROMs, magnetic tapes, floppy disks and optical or data storage devices as described in the context of a write-once or rewritable recording medium, may be utilized as long as the data replacement techniques as described in connection with FIG. 2, FIG. 3, FIG. 4, FIG. 6, FIG. 7, FIG. 8, FIGS. 9A-9B, FIGS. 10A-l0B, FIGS. 11A-11B, FIGS. 12A-12B, FIG. 13, FIG. 14, FIG. 15 and FIG. 16 are utilized. Likewise, a central controller can be implemented as a chipset, or alternatively, a general or special purposed computer programmed to perform the methods as described with reference to FIG. 13-16. Accordingly, it is intended, therefore, that that present invention not be limited to the various example embodiments disclosed, but that the present invention includes all embodiments falling within the scope of the appended claims.

What is claimed is:

1. An information storage medium comprising:
   a first area comprising an update block for updating an original block using replacement by logical overwrite (LOW);
   a second area comprising a replacement block for replacing the update block using replacement by defect, and,
   defect management area for recording a defect list entry,
   wherein the original block comprises the original data,
   the update block in the first area comprises update data for updating the original data,
   the replacement block in the second area comprises replacement data for replacing a defect of the update data, and
   the defect list entry for the original block comprises location information of the original block and location information of the replacement block
   wherein the replacement block is a recording/reproducing unit block, including a user data portion for user data and an additional information portion for location information of the update block.

2. The information storage medium as claimed in claim 1, wherein the additional information portion is recorded to have better error correction capability than that of the user data portion.

3. The information storage medium as claimed in claim 1, wherein the location information of the original block and the location information of the replacement block are represented by addresses of a physical space of the medium.

4. The information storage medium as claimed in claim 1, wherein the first area is a user data area, and the second area is a spare area.

5. A recording/reproducing apparatus comprising:
   a write/read unit arranged to record data on an information storage medium and read data from the information storage medium; and
   a controller for controlling the write/read unit to:
      record update data in an update block in a first area of the medium for updating original data recorded in an original block of the medium using replacement by logical overwrite (LOW), and
      if a defect is detected while the update data is being recorded in the update block in the first area to update the original data recorded in the original block of the medium using replacement by LOW, record replacement data for replacing the update data in a replacement block in a second area of the medium using replacement by defect,
   wherein the controller further generates a defect list entry for the original block including location information of the original block and location information of the replacement block, and controls the write/read unit to record the defect list entry for the original block in a defect management area
   wherein the replacement block is a recording/reproducing unit block including a user data portion for user data and an additional information portion for the location information of the update block.

6. The recording/reproducing apparatus as claimed in claim 5, wherein the controller further controls the write/read unit to record the additional information portion so that the additional information portion has better error correction capability than that of the user data portion.

7. The recording/reproducing apparatus as claimed in claim 5, wherein the location information of the original block and the location information of the replacement block are represented by addresses of a physical space of the medium.

8. The recording/reproducing apparatus as claimed in claim 5, wherein the first area is a user data area, and the second area is a spare area.

9. A data reproducing apparatus comprising:
   a read unit to read data from an information storage medium comprising a first area comprising an update block for updating an original block using replacement by logical overwrite (LOW); a second area comprising a replacement block for replacing the update block using replacement by defect; and a defect management area for recording a defect list entry; and
   a controller controlling the read unit to read the defect list entry for the original block comprising location information of the original block and location information of the replacement block, from the defect management area, and to read the replacement block using the defect list entry, wherein the original block comprises the original data, the update block in the first area comprises update data for updating the original data in the original block, and the replacement block in the second area comprises replacement data for replacing a defect of the update data in the update block wherein the replacement block is a recording/reproducing unit block including a user data portion for user data and an additional information portion for location information of the update block.

10. A data reproducing apparatus comprising:

a read unit which reads data from an information storage medium; and a controller which controls the read unit to read a defect list entry comprising location information of a first block and location information of a third block, from the information storage medium, and reproduces data from the information storage medium using the defect list entry, wherein the first block comprises original data, and wherein the third block comprises replacement data using replacement by defect, by detection of a defect in a second block while update data for replacing the original data is being recorded in the second block using replacement by logical overwrite (LOW)

wherein the third block is a recording/reproducing unit block including a user data portion for user data and an additional information portion for location information of the second block.

* * * * *